(12) United States Patent
Seibold

(10) Patent No.: US 10,556,529 B2
(45) Date of Patent: Feb. 11, 2020

(54) SEAT STRUCTURE

(71) Applicant: Johnson Controls Technology Company, Plymouth, MI (US)

(72) Inventor: Kurt Seibold, Farmington Hills, MI (US)

(73) Assignee: ADIENT LUXEMBOURG HOLDING S.A.R.L., Luxembourg (LU)

( * ) Notice: Subject to any disclaimer, the term of this patent is extended or adjusted under 35 U.S.C. 154(b) by 342 days.

(21) Appl. No.: 15/027,579

(22) PCT Filed: Oct. 3, 2014

(86) PCT No.: PCT/US2014/058966
§ 371 (c)(1),
(2) Date: Apr. 6, 2016

(87) PCT Pub. No.: WO2015/054047
PCT Pub. Date: Apr. 16, 2015

(65) Prior Publication Data
US 2016/0243967 A1  Aug. 25, 2016

Related U.S. Application Data

(60) Provisional application No. 61/887,564, filed on Oct. 7, 2013.

(51) Int. Cl.
*B60N 2/70* (2006.01)
*B60N 2/68* (2006.01)
*B60N 2/38* (2006.01)
*B60N 2/52* (2006.01)
*B60N 2/50* (2006.01)
*B60N 2/42* (2006.01)
*B60N 2/66* (2006.01)

(52) U.S. Cl.
CPC ............ *B60N 2/70* (2013.01); *B60N 2/38* (2013.01); *B60N 2/42* (2013.01); *B60N 2/501* (2013.01); *B60N 2/525* (2013.01); *B60N 2/527* (2013.01); *B60N 2/66* (2013.01); *B60N 2/68* (2013.01); *B60N 2/7094* (2013.01); *B60N 2/667* (2015.04); *B60N 2/6671* (2015.04)

(58) Field of Classification Search
CPC .......... B60N 2/70; B60N 2/7094; B60N 2/66; B60N 2/667; B60N 2/6671
USPC ............... 297/216.13, 452.3, 452.29, 452.63
See application file for complete search history.

(56) References Cited

U.S. PATENT DOCUMENTS

| | | | | |
|---|---|---|---|---|
| 219,589 A | * | 9/1879 | Mayo | A47C 3/12 297/452.15 |
| 1,203,293 A | * | 10/1916 | Wilkinson | A47C 5/06 297/452.52 |

(Continued)

FOREIGN PATENT DOCUMENTS

| CN | 12 14 895 A | 4/1999 |
|---|---|---|
| CN | 102 476 600 A | 5/2012 |

(Continued)

*Primary Examiner* — Syed A Islam
(74) *Attorney, Agent, or Firm* — McGlew and Tuttle, P.C.

(57) ABSTRACT

A seat structure, particularly for a vehicle, that includes a seatback structure and a seat frame. The seatback structure includes a seatback frame and a plurality of seatback support members. The seatback support members are connected to the seatback frame. The seatback structure is connected to the seat frame.

20 Claims, 23 Drawing Sheets

(56) References Cited

U.S. PATENT DOCUMENTS

| | | | | |
|---|---|---|---|---|
| 2,530,924 A | * | 11/1950 | Turner | A47C 1/033 |
| | | | | 297/356 |
| 4,892,356 A | | 1/1990 | Pittman et al. | |
| 5,284,380 A | * | 2/1994 | Gehry | A47C 5/02 |
| | | | | 297/451.9 |
| 5,366,273 A | * | 11/1994 | Bresch | A47C 3/021 |
| | | | | 297/284.2 |
| 5,664,835 A | * | 9/1997 | Desanta | A47C 3/021 |
| | | | | 297/302.1 |
| 6,991,288 B2 | | 1/2006 | Farquhar et al. | |
| 7,128,372 B2 | | 10/2006 | Farquhar et al. | |
| 7,614,694 B2 | | 11/2009 | Forgatsch et al. | |
| 7,780,233 B2 | | 8/2010 | McMillen | |
| 7,862,119 B2 | * | 1/2011 | Schafer | B60N 2/0232 |
| | | | | 297/284.8 |
| 8,210,612 B2 | | 7/2012 | Adams et al. | |
| 8,360,522 B2 | * | 1/2013 | Akutsu | B60N 2/42781 |
| | | | | 297/284.4 |
| 8,876,209 B2 | * | 11/2014 | Peterson | A47C 3/12 |
| | | | | 297/284.1 |
| 2004/0061363 A1 | | 4/2004 | Farquhar et al. | |
| 2005/0280299 A1 | * | 12/2005 | Vogt | B60N 2/66 |
| | | | | 297/284.4 |
| 2007/0051850 A1 | * | 3/2007 | Peck | B64D 25/04 |
| | | | | 244/122 R |
| 2007/0205643 A1 | | 9/2007 | Fujita et al. | |
| 2009/0146476 A1 | * | 6/2009 | Kan | A47C 1/03255 |
| | | | | 297/284.4 |
| 2009/0224587 A1 | * | 9/2009 | Lawall | B60N 2/0224 |
| | | | | 297/353 |
| 2012/0119551 A1 | | 5/2012 | Brncick et al. | |
| 2013/0119723 A1 | * | 5/2013 | Nitsuma | B60N 2/4228 |
| | | | | 297/216.13 |
| 2013/0134749 A1 | * | 5/2013 | Awata | B60N 2/5825 |
| | | | | 297/216.13 |
| 2014/0070583 A1 | * | 3/2014 | McMillen | B60N 2/66 |
| | | | | 297/284.4 |
| 2014/0265493 A1 | * | 9/2014 | Machael | A47C 7/445 |
| | | | | 297/285 |
| 2015/0210188 A1 | * | 7/2015 | Hoshi | B60N 2/68 |
| | | | | 297/344.12 |
| 2015/0210194 A1 | * | 7/2015 | Furuta | B60N 2/68 |
| | | | | 297/391 |
| 2015/0224901 A1 | * | 8/2015 | Furuta | B60N 2/68 |
| | | | | 297/452.18 |
| 2019/0225125 A1 | * | 7/2019 | Song | B60N 2/6673 |

FOREIGN PATENT DOCUMENTS

| | | |
|---|---|---|
| CN | 103 079 887 A | 5/2013 |
| JP | 2000-350635 A | 12/2000 |
| JP | 2006-218012 A | 8/2006 |
| JP | 2009-268780 A | 11/2009 |
| JP | 2012-035811 A | 2/2012 |

* cited by examiner

SEAT STRUCTURE

CROSS REFERENCE TO RELATED APPLICATIONS

This application is a United States National Phase application of International Application PCT/US2014/058966 filed Oct. 3, 2014 and claims the benefit of priority under 35 U.S.C. § 119 of U.S. Provisional Patent Application 61/887,564 filed Oct. 7, 2013 the entire contents of which are incorporated herein by reference.

FIELD OF THE INVENTION

The present invention relates to a seat structure, particularly a seat for a vehicle, such as a motor vehicle.

BACKGROUND OF THE INVENTION

Conventional seat typically use foam, which provides for a dated and old-fashioned design. Further, conventional seats provide problematic spacing issues, particularly in the lower segments of the seats.

U.S. Pat. No. 6,991,288 B2 discloses a vehicle seat assembly that includes a seatback frame and a lumbar support system operatively mounted to the seatback frame. The lumbar support system includes a lower suspension mechanism that is generally aligned with the pelvic and lumbar regions of the occupant of the seat assembly. The lower suspension mechanism includes a band of flexible material that is stretched about a pair of upstanding support members so as to have a predetermined tension for providing support for the occupant of the seat assembly at the pelvic and lumbar regions.

U.S. Pat. No. 7,128,372 B2 discloses a vehicle seat assembly including a seatback frame and a lumbar support system operatively mounted to the seatback frame. The lumbar support system includes a lower suspension mechanism that is generally aligned with the pelvic and lumbar regions of the occupant of the seat assembly. The lower suspension mechanism includes a pair of bands of flexible material that are stretched about a pair of upstanding support members so as to have a predetermined tension for providing support for the occupant of the seat assembly at the pelvic and lumbar regions.

U.S. Pat. No. 7,614,694 B2 discloses a seat, in particular an aircraft passenger seat, comprising seat components such as a seat and a backrest, in addition to at least one cover part, which is pre-tensioned in at least one direction and at least one section and which extends between frame parts of an allocated seat component. As the seat is provided with at least one controllable adjusting unit, which permits the specification of different pre-tensions for the respective cover part within a predefinable range and in a reversible manner, the respective seat user, who occupies the seat can adapt the seat to his or her comfort and health requirements.

U.S. Pat. No. 7,780,233 B2 discloses a belt-type lumbar support that includes a belt having first and second end portions. A first attachment tab is located at the first end portion, and a second attachment tab is located at the second end portion. A spring is located at the first end portion and is connected to the first attachment tab. A cable is located at the second end portion and is connected to the second attachment tab. A first belt extension is located at the first end portion and proximate to the first attachment tab and has a first belt extension tongue, wherein at least a portion of the belt extension tongue extends over the spring. A second belt extension is located at the second end portion and proximate to the second attachment tab and has a second belt extension tongue, wherein at least a portion of the second belt extension tongue extends over the cable.

U.S. Pat. No. 8,210,612 B2 discloses an occupant lumbar support system for a furniture member that includes a belt member having a longitudinally elastically flexible first portion having opposite first and second ends and a longitudinally inelastic second portion. The first portion is connected to the second portion at the first and second ends. The second portion when spaced freely away from the first portion except at the first and second ends defines a belt member free state. The second portion has opposed first and second connecting ends extending freely away from the first and second ends. First and second tensioning members are each connected to one of the first and second connecting ends whereby operation of the first and second tensioning members longitudinally elastically stretches the first portion until the second portion moves into substantially continuous contact with the first portion between the first and second ends defining a belt member aggressive state.

SUMMARY OF THE INVENTION

An object of the present invention is to provide a seat that is thin, dynamic and provides an updated and contemporary seat design.

The seat may be used in a motor vehicle. The seat comprises a seatback structure. The seatback structure comprises a seatback frame and a plurality of vertical seatback support members. The seatback support members are connected to the seatback frame. The seat includes a seat frame. The seatback structure is connected to the seat frame.

Vertical strips may be interconnected in a ribbed fashion to create a wave, whether sinusoidal or another shape, to control elongation laterally thereby creating an inherent suspension system for the seat structure.

The seatback structure may of an adequate size, such as the seatback structure being of a size that is greater than a size of an occupant. The seatback structure may have no internal appendages, such as headrest rods, to impede passage of the occupant during a crash state.

A member may be fixed laterally between side members. The member may limit the passage of the occupant to a predefined limit during the crash state.

The seatback frame and the seat frame are associated with a snap connection. The seatback frame snaps onto side members of the seat frame. The seatback frame includes a seatback frame surface with spaced apart ends that form a seat frame insertion gap that is smaller than a dimension of the seat frame to generate a snap in retaining function as a portion of the seat frame is moved through the seat frame insertion gap and is seated in the seatback frame surface. The dimension of the seat frame may correspond to the thickness of the seat frame or the diameter of the seat frame. The seat frame insertion gap may be smaller than a dimension of a first side member wherein the dimension of the first side member corresponds to a thickness of the first side member.

The seatback frame comprises a lower portion and an upper portion. Each of the plurality of seatback support members comprises a strip of material that extends from the lower portion to the upper portion. The width and/or the cross section of the material of each of the plurality of seatback support members may be varied to adjust the compliance and/or elastic deformation properties of the seatback structure. The strip of material is compliant and/or elastically deformable to allow the shoulders of a user to sink in to the seat. The seatback structure is mostly flat along the shoulders of the user. However, the seatback structure may be concave in the area of the occupant's shoulder.

The seatback structure comprises a lumbar support member. The lumbar support member is connected to the seatback frame. The lumbar support member may or may not be connected to the plurality of seatback support members. The lumbar support member can be connected to some of the plurality of seatback support members. The lumbar support member can be several compliant mini members and can be of any construction to allow deflection, which includes an elastomer or steel construction. The lumbar support member provides three stages. The first stage is a sink in stage, the second stage is a supporting surface and a third stage which is tuned for occupant management during a rear impact event. The lumbar support member may be a molded elastomer. A stiffness, compliance and/or elastic deformation of the plurality of seatback support members is adjusted based on a tension of the lumbar support member. In one embodiment, the lumbar support member is one elastic type panel. In another embodiment, the lumbar support member comprises a plurality of individual springs. In yet another embodiment of the present invention, the lumbar support member is a lumbar strap. The tension of the lumbar support member can be adjusted manually or via a device for adjusting the tension of the lumbar support member wherein the device is connected to a power source. It is possible to adjust the location of the lumbar support member to change the shape of a S curve in the lumbar support member.

A strain gauge can be added to the lumbar support member or to the strips of material to provide an actively controlled lumbar support member. The strain gauge can be molded to the lumber support member or adhered to the lumbar support strap. The strain gauge is used in a self adjusting feedback loop as the strain gauge would detect the contour and pressure in the lumbar region of the plurality of seatback supporting members. An active system can be added to the lumbar support member to allow the lumbar support member to break away/allow deflection during a crash event. The seatback structure could be reset after the crash event to provide a usable seatback structure. The plurality of members provide an S-shape in a normal state, which changes to a C-shape upon impact in a crash event. Due to the seatback frame being wider than the occupant, the occupant sinks into the seat. This allows displacement of the plurality of seatback support members to thereby reduce load and allows the occupant to sink into the seat and make contact with the headrest prior to the occupant's head whipping rearward to thereby prevent whiplash. The seatback support frame has a leading surface to funnel the occupant to allow the occupant to sink into the seatback support structure. The upper cross bar or section of the seat frame is tall enough in height to allow this.

Each of the plurality of seatback support members comprises a lower portion. The lumbar support member is connected to the lower portion of one or more of the plurality seatback support members. At least the lumbar support member and the lower portion of the seatback support members define a lumbar region of the seatback structure.

The plurality of seatback support members define a user support seat surface. Each of the plurality of seatback support members comprises a shoulder support surface and a lumbar support surface. The shoulder support surface of each of the seatback support members defines a shoulder support region of the user support seat surface. The lumbar support surface of each of the seatback support members defines a lumbar support region of the user seat surface. The lumbar support region of the user seat surface is concave. The shoulder support region may have a concavity that is less than a concavity of the lumbar support region. The seatback structure is stiffest (least compliant and/or elastically deformable) in the lumbar region due to the laterally elastic, compliant, member. This provides a seatback structure that elastically deformations when a user sits in the seat wherein portions of the seatback structure deform more than other portions of the seatback structure when the user sits in the seat. The strips of material have a length that essentially remains the same and compliance comes from lateral displacement at the lumbar region of the seatback structure.

The shoulder region allows penetration of an occupant so that the occupant may sink in to the seat. A tube or other form of laterally constraining member of the seat frame may constrain motion of the head supporting surface and laterally stabilize the side members.

The user support seat surface may be substantially flat in the shoulder support region.

The seat comprises a headrest structure that is connected to the seat frame wherein the headrest structure is independent from the seatback structure. In another embodiment, a tall seatback is provided with each of the plurality of seatback support members comprising a head support surface wherein the head support surface of each of the plurality of seatback support members defines a headrest support for a user.

A control means may be provided for controlling the tension of the lumbar support member. The control means receives input from the strain gauge as to the pressure and deflection of one or more of the plurality of seatback support members so that it is possible to determine how deep the occupant deflects into the seat so that the supporting shape of one or more of the plurality of seatback support members can be controlled by the control means. The control means may be wirelessly connected to the strain gauge. In another embodiment, the control means may be physically connected to the strain gauge via cable(s) and one or more wires.

Each of the plurality of seatback support members may be elastically deformable so that the seatback structure deflects. This allows the seatback structure to go from a first state into a secondary state during impact in a crash event so that the occupant sinks into the seat during the crash event. This eliminates whiplash. At least a portion of each of the plurality of seatback support members defines a concave surface that has a first concavity in a normal state. The concave surface has a second concavity in a crash state. The second concavity is more concave than the first concavity since the elastic deformation of the plurality of seatback support members is greater in the crash state than the elastic deformation of the plurality of seatback support members in the normal state. Even though the support members elastically deform the support members work as a tensile member and elongate minimally. The seat surface is concave in the lower region (lumbar region) of the seatback structure. The shoulder region of the seat surface is flatter when compared with the lower region (lumbar region) of the seatback structure.

The seat frame comprises a first seat frame portion, a second seat frame portion, a first side member and a second side member. The first seat frame portion is connected to the second seat frame portion, the first side member and the second side member. The first side member is arranged on one side of the seat frame. The second side member is arranged on another side of the seat frame. The first side member is opposite the second side member.

The seatback seat frame engages the first side member and the second side member. The seatback frame could comprise another seatback frame surface with spaced apart ends forming another seat frame insertion gap that is smaller than a dimension of the second side member to generate a snap in retaining function as a portion of the seat frame is moved through the another seat frame insertion gap and is seated in the another seatback frame surface. The dimension of the second side member corresponds to a thickness of the second side member. This allows the seatback seat frame to snap on to the seat frame. It is also possible for the seat frame to form an insertion gap such that the seat frame snaps on to the seatback seat frame.

The seat may comprise a trim panel. The trim panel and the seatback structure are associated with a snap connection wherein the trim panel and the seatback structure are connected via the snap connection. The trim panel comprises a trim panel retaining surface. The trim panel retaining surface defines a trim panel insertion gap. The trim panel is connected to the seat frame and the seatback support structure. The trim panel is flexible to generate a snap in retaining function as at least a portion of the seatback structure is moved through the trim panel insertion gap and is seated in the trim panel retaining surface. It is also possible for the seatback structure to include an insertion gap such that a snap in retaining function is generated as at least a portion of the trim panel is moved through the insertion gap of the seatback structure. In another embodiment, a suspension strip is used, such as a listing wire, to attach trim along the edges of the seatback structure. Vertical strips can be used as listing wire if they are individual. It is also possible to trim the seat with conventional envelope cover or fabric on surface and the rear panel.

Each of the plurality of seatback support members is located at a spaced location from another one of the plurality of seatback support members. In another embodiment of the present invention, each of the plurality of seatback support members is adjacent another one of the seatback support members.

A plurality of fastener elements may connect the plurality of seatback support members to the seatback frame. One end of each of the seatback support members is connected to the upper portion of the seatback frame by one of the fastener elements. Another end of the seatback support members is connected to the lower portion of the seatback frame via another one of the fastener elements.

According to the present invention, a seat for a motor vehicle comprises a seatback suspension panel. The seatback suspension panel comprises a seatback suspension panel frame and a plurality of compliant seatback suspension panel elements. Each of the seatback suspension panel elements is connected to the seatback suspension panel frame. The seat comprises a seat frame structure. The seatback suspension panel is connected to the seat frame.

The plurality of compliant seatback suspension panel elements define a seat support surface having at least a concave surface. The concave surface has a first concavity in a non-crash state of the seatback suspension panel. The concave surface has a second concavity in a crash state of the seatback suspension panel. The first concavity is less concave than the second concavity. The displacement of the deformable seatback suspension panel elements is greater in the crash state than the displacement of the seatback suspension panel elements in the non-crash state.

The seat includes a spring that extends from one side of the seatback suspension panel frame to another side of the seatback suspension panel frame. In one embodiment, more than one spring is provided. The spring is connected to one or more of the seatback suspension panel elements. The setback suspension panel elements comprise a lower portion. The lower portion and the spring define a lumbar region of the seatback suspension panel for supporting the lumbar region of a user.

The seat comprises a control means for controlling a stiffness and/or tension of the spring. The elastic deformation of the lower portion of the plurality of seatback suspension panel elements is adjusted based on the stiffness and/or tension of the spring.

The seat provides great thermodynamic comfort as well as a standardized load distribution. Further, the concave surface of the seat also provides improved comfort to the user. The structural integrity of the seat may be maintained by a standard steel architecture. The use of the plurality of seatback support members substantially reduces the use of foam. It also possible to completely eliminate the use of foam in the construction of the seat. This reduces the mass of the seat and provides the seat with a slim silhouette. In addition, compression molded trim may be used for closeouts and the back of the seat may be closed out with compression molded trim while creating pillars, which is extremely mass efficient and reduces the overall weight of the seat.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
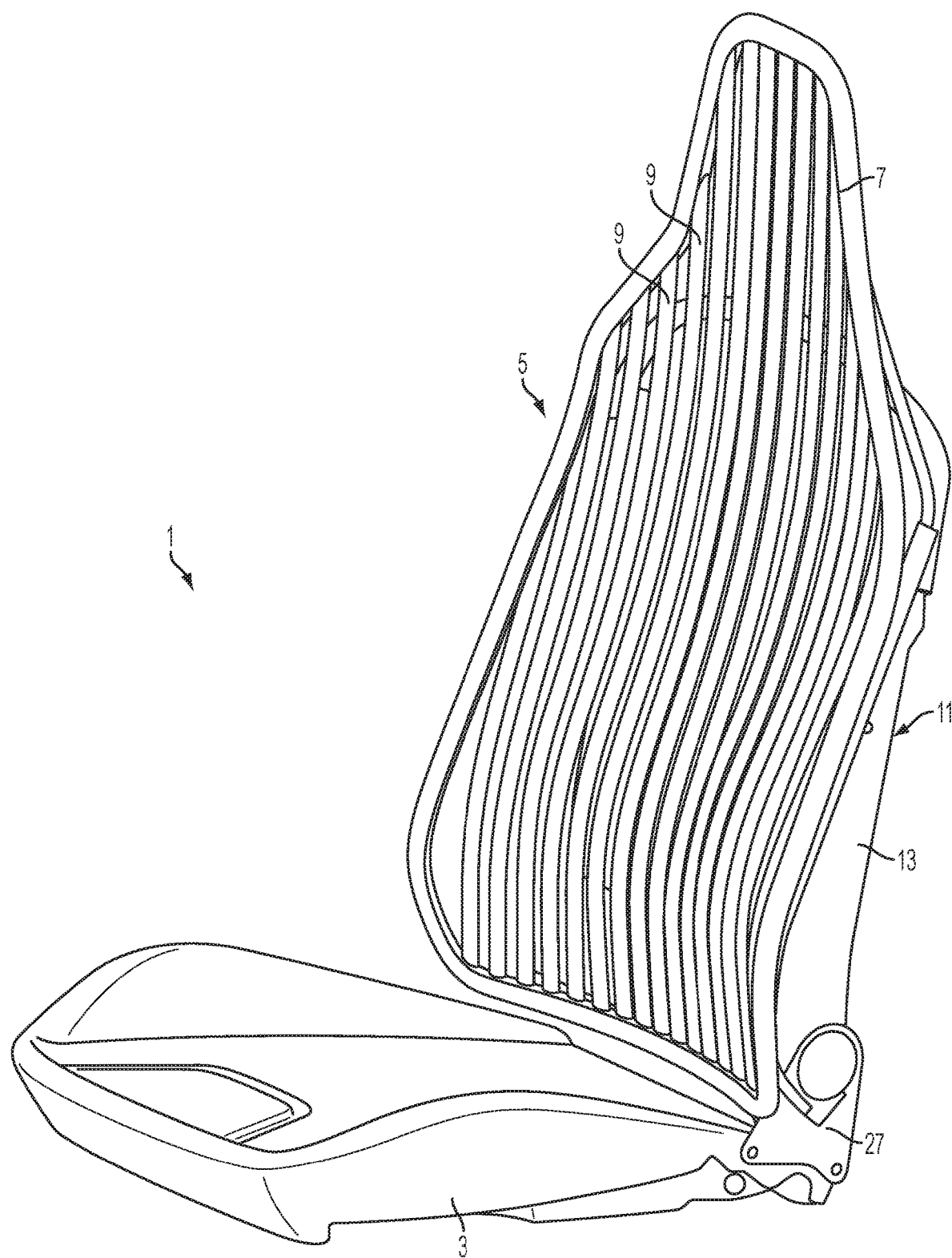
FIG. 1 is a perspective view of one embodiment of the seat of the present invention.

Referring to the drawings in particular, FIG. 1 shows a view of one embodiment of the seat 1 of the present invention. The seat 1 comprises a seat substructure 3 and a seatback structure 5. The seat substructure 3 supports a user's buttocks and at least a portion of a user's legs. The seatback structure 5 supports at least the back and shoulders of a user. The seatback structure 5 includes a seatback frame 7 and a plurality of seatback support members 9, which extend in a vertical direction. The vertically extending seatback support members 9 are deformable such that an occupant sinks into the seat 1. This allows the occupant to be at least partially surrounded by the seatback frame 7. It is possible that the seatback support members 9 deflect when the occupant is in the seat 1 such that the occupant is entirely surrounded by the seatback frame 7. Different portions of each of the seatback support member 9 may have different compliance and/or elastic deformation properties such that different portions of each of the seatback support members 9 deform or bend more than other portions of each of the seatback support members 9. For example, a lower portion of the seatback support members may bend less (less deformable) than an upper portion of the seatback support members 19, which provides the occupant with a sink in feel. This is accomplished by providing seatback support member 9 having portions of varying width and/or thickness. The seat substructure 3 and the seatback structure 5 are connected to each other via a seat connection plate 27. The seatback structure 5 may be pivotably connected to the seat substructure 3 such that the seatback structure 5 moves relative to the seat substructure 3.

The seatback frame 7 is connected to a seat frame 11. The seat frame 11 includes a first side member 13, a second side member 15 (see FIG. 3), a first frame portion 21 (see FIG. 3), a second frame portion 23 (see FIG. 3) and a lower frame portion 25 (see FIG. 3). The first frame portion 21 and the second frame portion 23 could be of a tubular construction and may be formed of a hollow tube of material, particularly metal, such as steel or aluminum. It is also possible that the first frame portion 21 and the second frame portion 23 are formed of a solid material having a predetermined diameter. The first frame portion 21 is connected to the second frame portion 23 (see FIG. 5 and FIG. 6). In one embodiment, it is possible to connect the plurality of seatback support members 9 directly to the first frame portion 21. Any compliant and/or elastically deformable material may be used to form the plurality of support members 9, polypropylene is feasible but a more compliant thermoplastic polyurethane (TPU) or resilient thermoplastic elastomer (TPE) is preferred.

Figure 2:
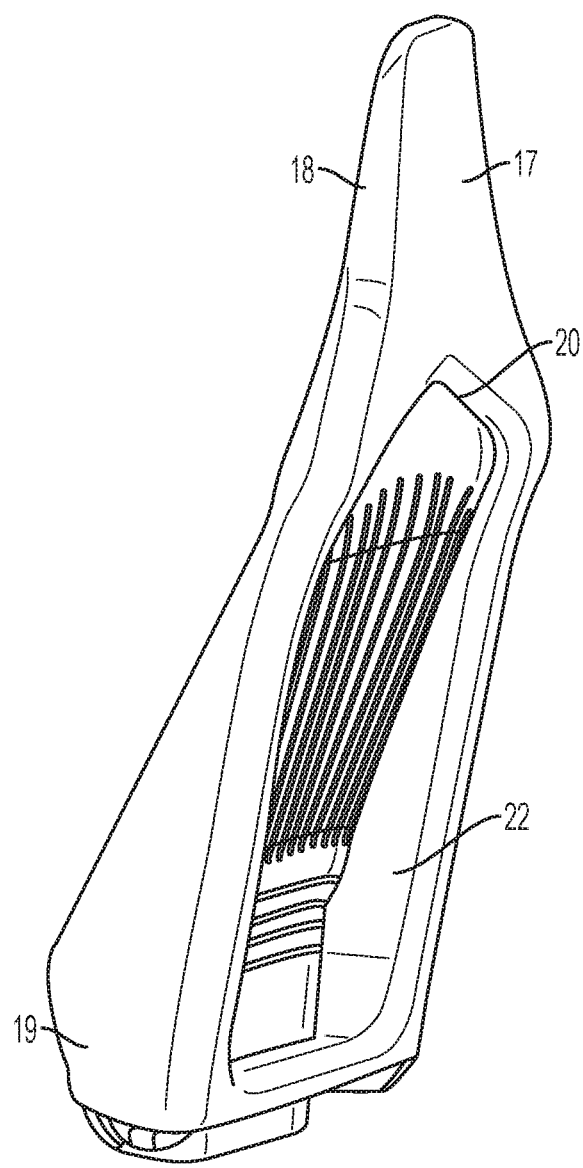
FIG. 2 is a perspective view of the seatback of FIG. 1.

Trim panel 17 and the seatback frame 7 are associated with a snap connection 18 as shown in FIG. 2. The trim panel 17 is at least connected to the seatback frame 7 via the snap connection 18. The trim panel 17 may have an insertion gap that receives at least a portion of the seatback frame 7 to generate a snap in retaining function of the trim panel 7 to the seatback frame 7. In another embodiment, the seatback frame 7 has an insertion gap for receiving at least a portion of the trim panel 17 to generate a snap in retaining function as the portion of the trim panel 17 is moved through the insertion gap of the seatback frame 7. The trim panel 17 and the seat frame 11 is also be connected to the seat frame 11 via a snap connection 20 wherein at least a portion of the trim panel 17 is connected to the seat frame 11 via the snap connection 20. Trim panel pillar 19 is connected to the first side member 13. Another trim panel pillar 22 is connected to the second side member 13. The trim panel pillar 19 and the another trim panel pillar 22 are connected to the trim panel 17.

Figure 3:
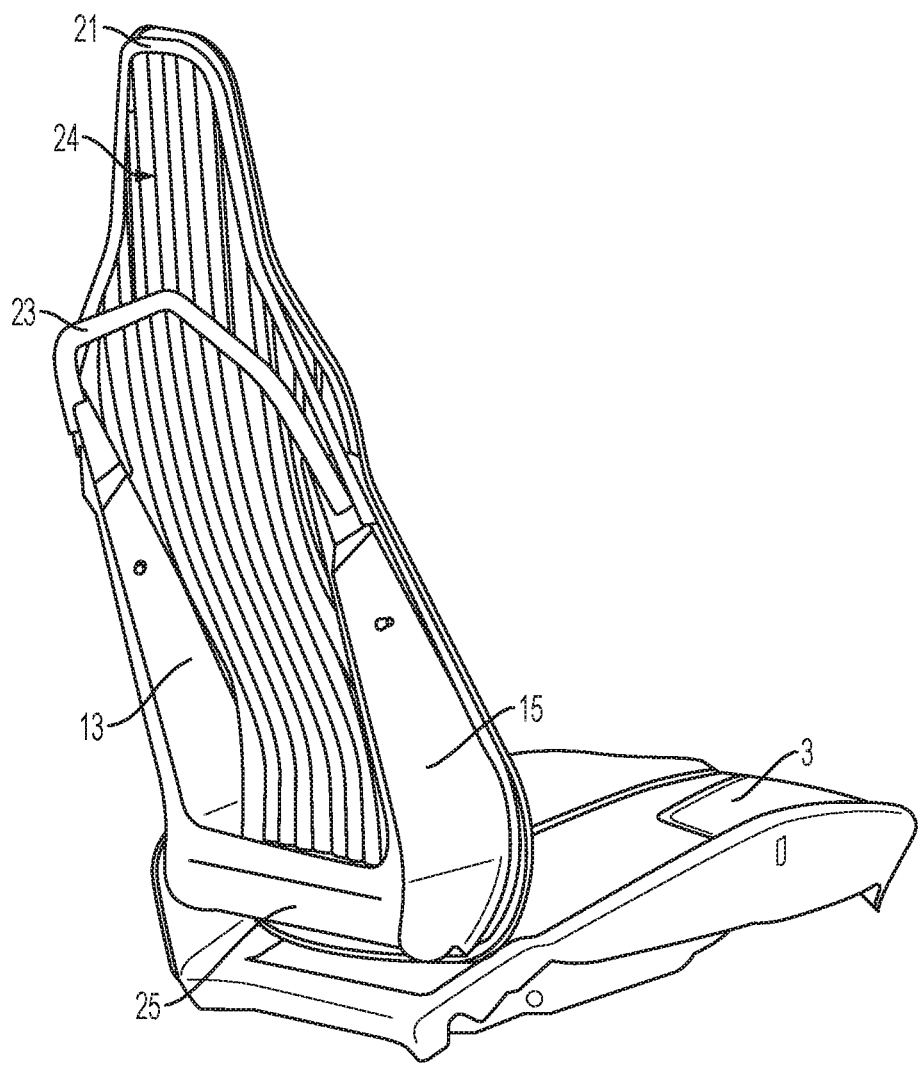
FIG. 3 is another perspective view of the seat of FIG. 1.

FIG. 3 is a perspective view of the seat of FIG. 1. The first side member 13, the second side member 15, the first frame portion 21 and the second frame portion 23 are connected to a lower frame portion 25. The second frame portion 23 constrains motion of a head supporting surface 24 and laterally stabilizes the first side member 13 and the second side member 15.

Figure 4:
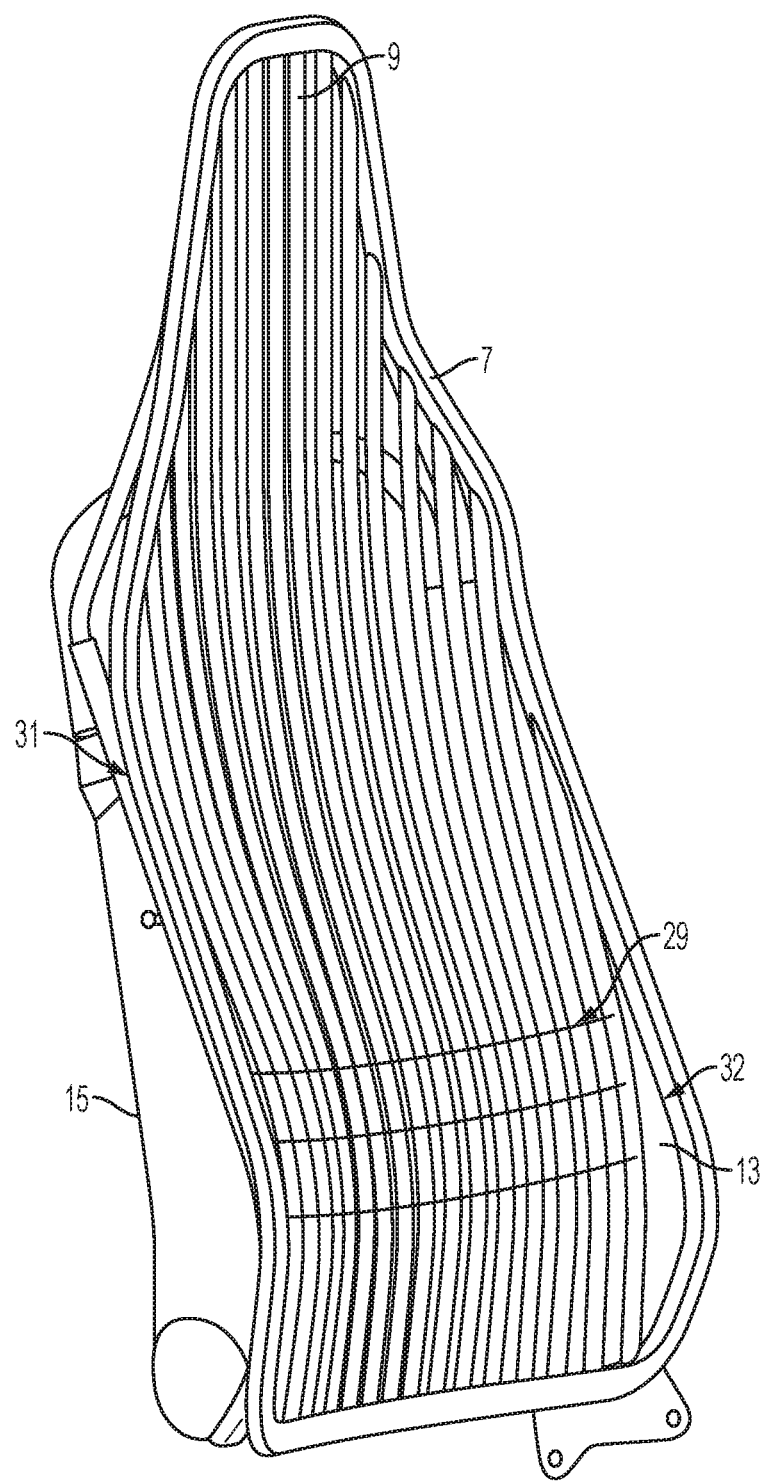
FIG. 4 is a perspective view of the seatback of FIG. 1.

FIG. 4 is a perspective view of the seatback of FIG. 1. The seatback frame 7 and the first side member 13 are associated with a snap connection 31. The seatback frame 7 and the second side member 15 are associated with a snap connection 32. The snap connection 31 and the snap connection 32 are localized to constrain itself. The seatback frame 7 is connected to the first side member 13 via the snap connection 31. The seatback frame 7 is connected to the second side member 15 via the snap connection 32. The seatback frame 7 has a first insertion gap and a second insertion gap wherein the seatback frame 7 generates a snap in retaining function as at least a portion of the first side member 13 moves through the first insertion gap and as at least a portion of the second side member 15 moves through the second insertion gap. In another embodiment the first side member 13 may have an insertion gap and the second side member 15 may have an insertion gap such that the first side member 13 and the second side member 15 generates a snap in retaining function as a portion of the seatback frame 7 moves through the insertion gap of the first side member 13 and as a portion of the seatback frame 7 moves through the insertion gap of the second side member 13. A lumbar support member 29 is connected to the seatback support members 9 and the seatback frame 7. In another embodiment, it is possible that no lumbar support member is necessary.

Figure 5:
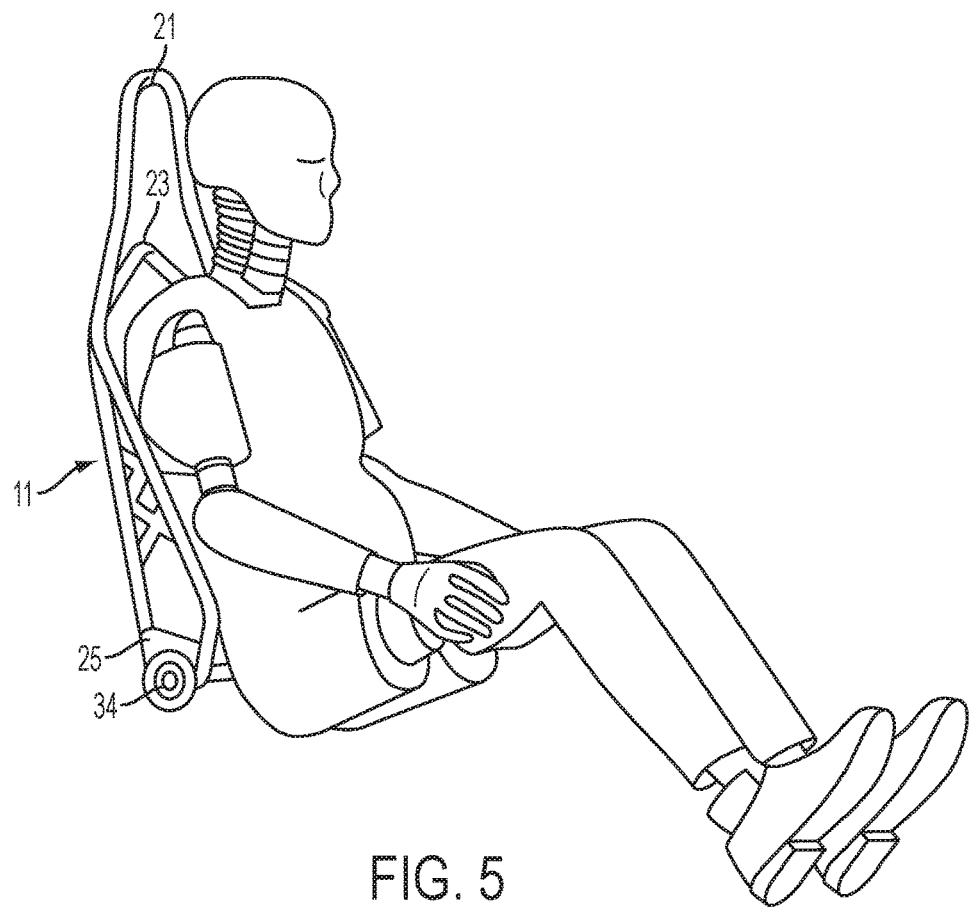
FIG. 5 is a partial perspective view of the details of the seat frame of the seat of FIG. 1.

FIG. 5 is a perspective view of the seat frame 11 of the seat 1 of FIG. 1 with the first side member 13 and the second side member 15 removed from the first frame portion 21 and the second frame portion 23. The first frame portion 21 may be one continuous piece or the first frame portion 21 may include a plurality of first frame sections. The first frame portion 21 is connected to the second frame portion 23. The first frame portion 21 and the second frame portion 23 are connected to the lower frame portion 25. The lower frame portion 25 is connected to a pivotable connection 34, which allows the seatback structure 5 to pivot relative to the seat substructure 3.

Figure 6:
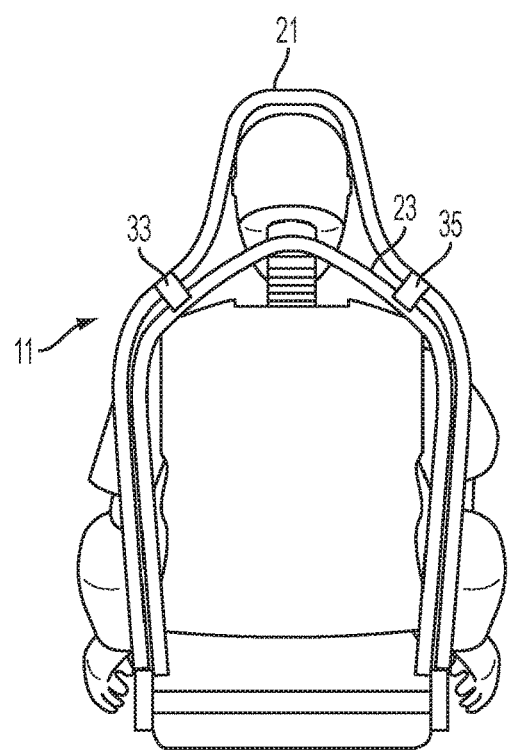
FIG. 6 is a rear view of the seat frame of FIG. 5.

FIG. 6 is a rear view of the seat frame 11 of FIG. 5. Connector elements 33, 35 are provided to connect the first frame portion 21 to the second frame portion 23. The connector elements 33 may be welded to the first frame portion 21 and the second frame portion 23. Any other suitable means may be used for connecting the connector elements 33 to the first frame portion 21 and the second frame portion 23.

Figure 7:
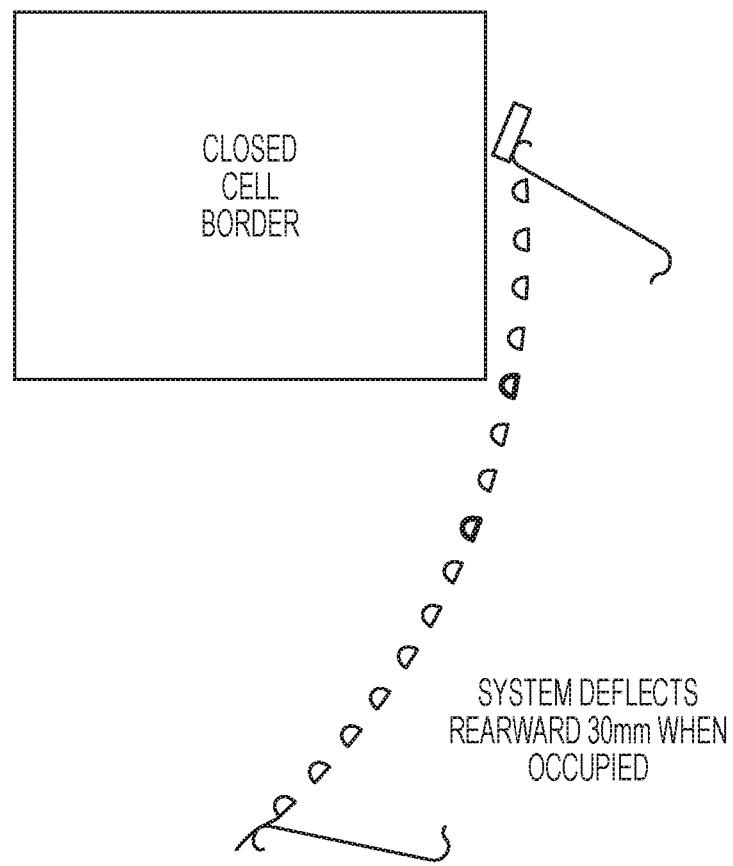
FIG. 7 is a schematic view of the rearward deflection of the seatback of FIG. 1.

FIG. 7 is a schematic view of the deflection of the seatback structure 5 of the seat 1 of FIG. 1. The seatback structure 5 as shown deflected 30 mm in a rearward direction when occupied by a user.

Figure 8:
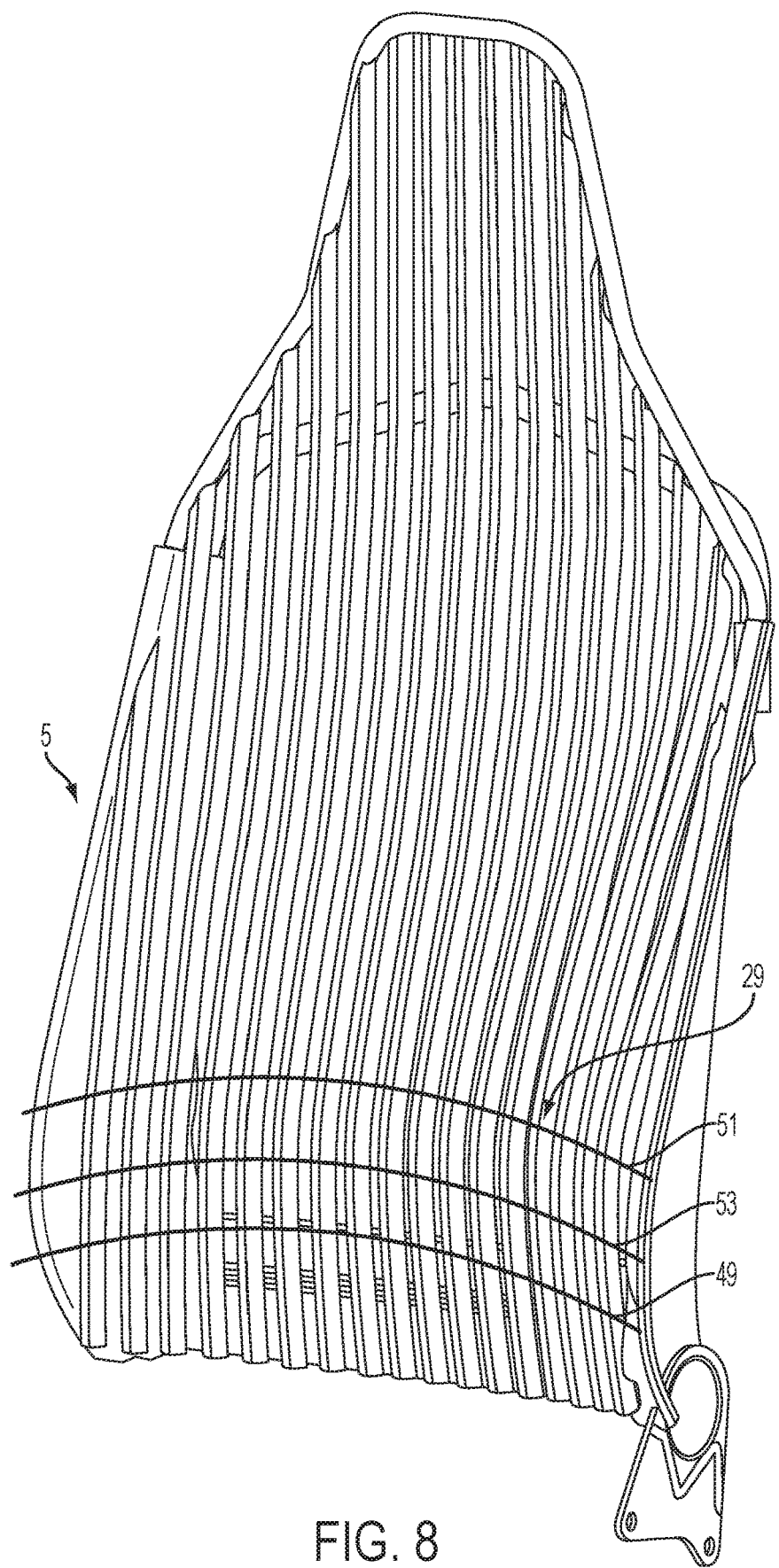
FIG. 8 is a perspective view of the seatback of the seat of FIG. 1.

FIG. 8 is a perspective view of the seatback structure 5 of FIG. 1. The lumbar support member 29 may comprise a plurality of springs 49, 51, 53. Instead of having a plurality of springs, the lumbar support member 29 may include a single, elastic type panel in another embodiment of the present invention that may be or may not be part of the molded seatback support members.

Figure 9:
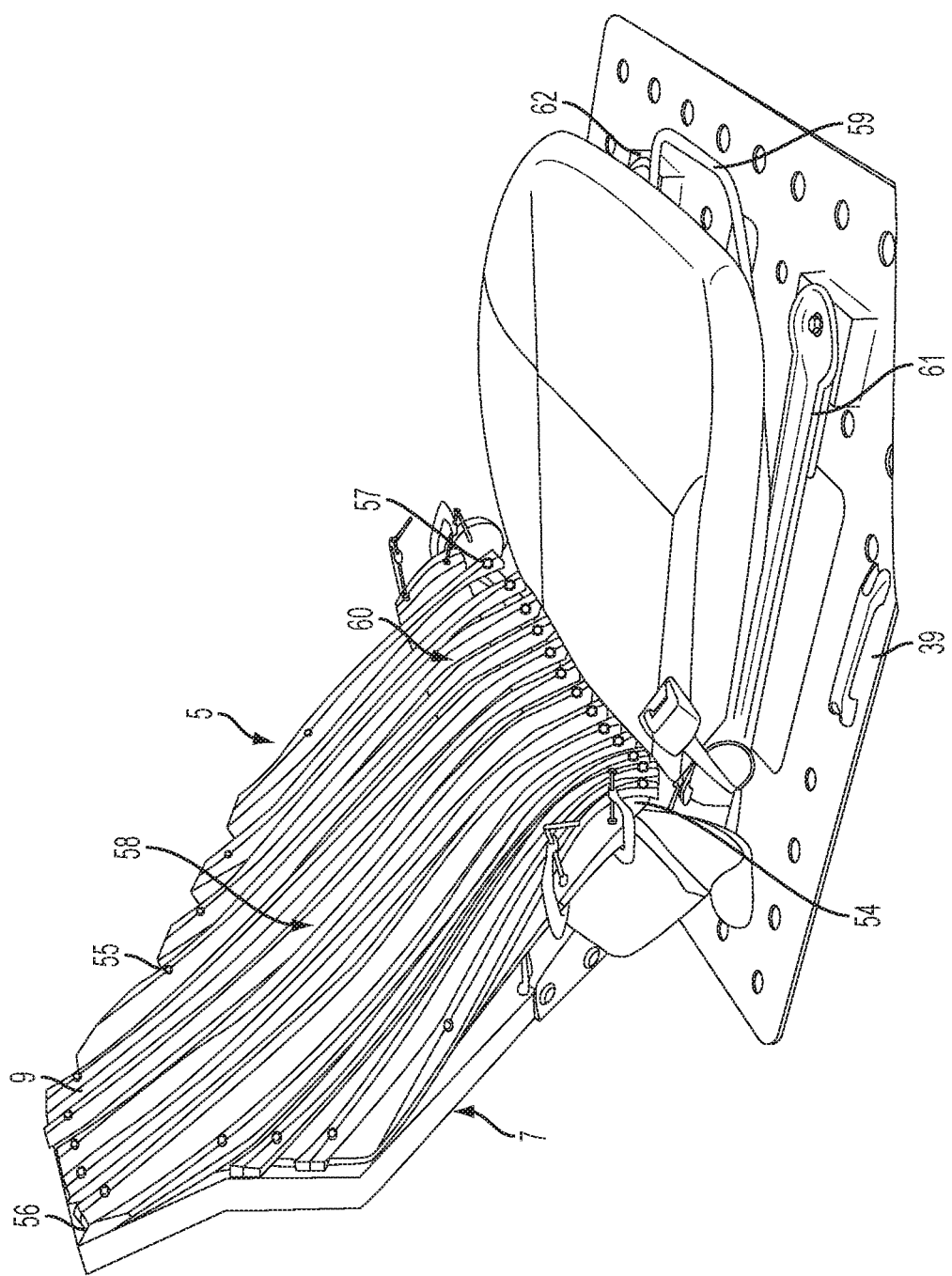
FIG. 9 is a perspective view of the seat of FIG. 1.
Figure 12:
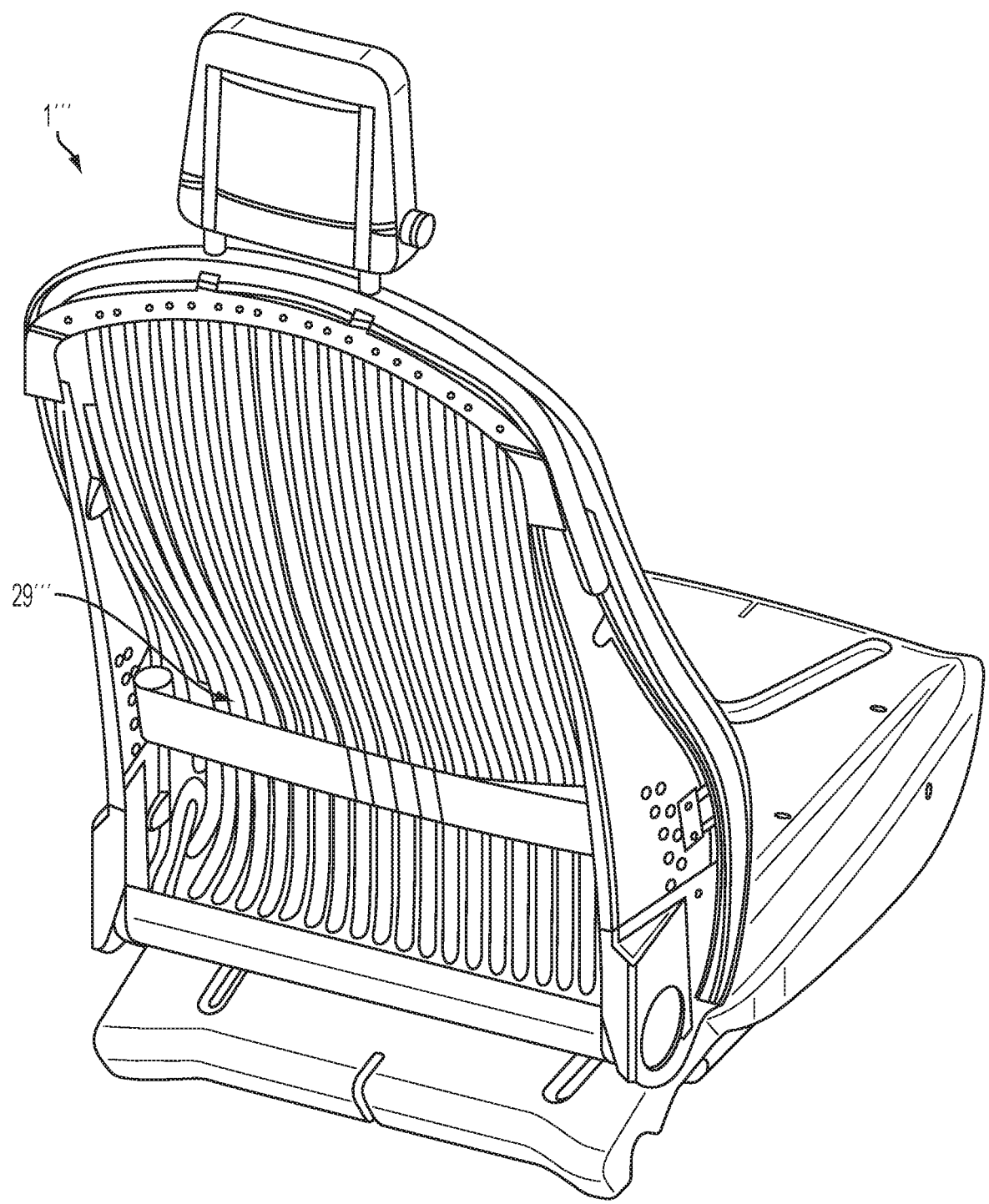
FIG. 12 is a rear perspective view of the seat of FIG. 11.

FIG. 9 is a perspective view of the seat 1 of FIG. 1. Each of the seatback support members 9 includes a strip of material that extends in a substantially vertical direction from a lower portion 54 of the seatback frame 7 to an upper portion 56 of the seatback frame 7. One end or one end portion of each of the seatback support members 9 is connected to the upper portion 56 via a fastener element 55. Another end or end portion of each of the seatback support members 9 is connected to the lower portion 54 via another fastener element 57. The seat 1 may be mounted to tracks 61, 62 such that the seat can be moved when the lever 59 is actuated. At least one of the tracks 61, 62 is connected to a floor 39 of a motor vehicle. The seatback structure 5 as shown in FIG. 12 is mostly flat along a region 58 of the plurality of support members 9 that supports the shoulders of the user. The region 60 of the support members 9 supports the lumbar region of the user. The lumbar region 60 has a concave shape wherein the concavity of the region 58 is less than the concavity of the lumbar region 60.

Figure 10:
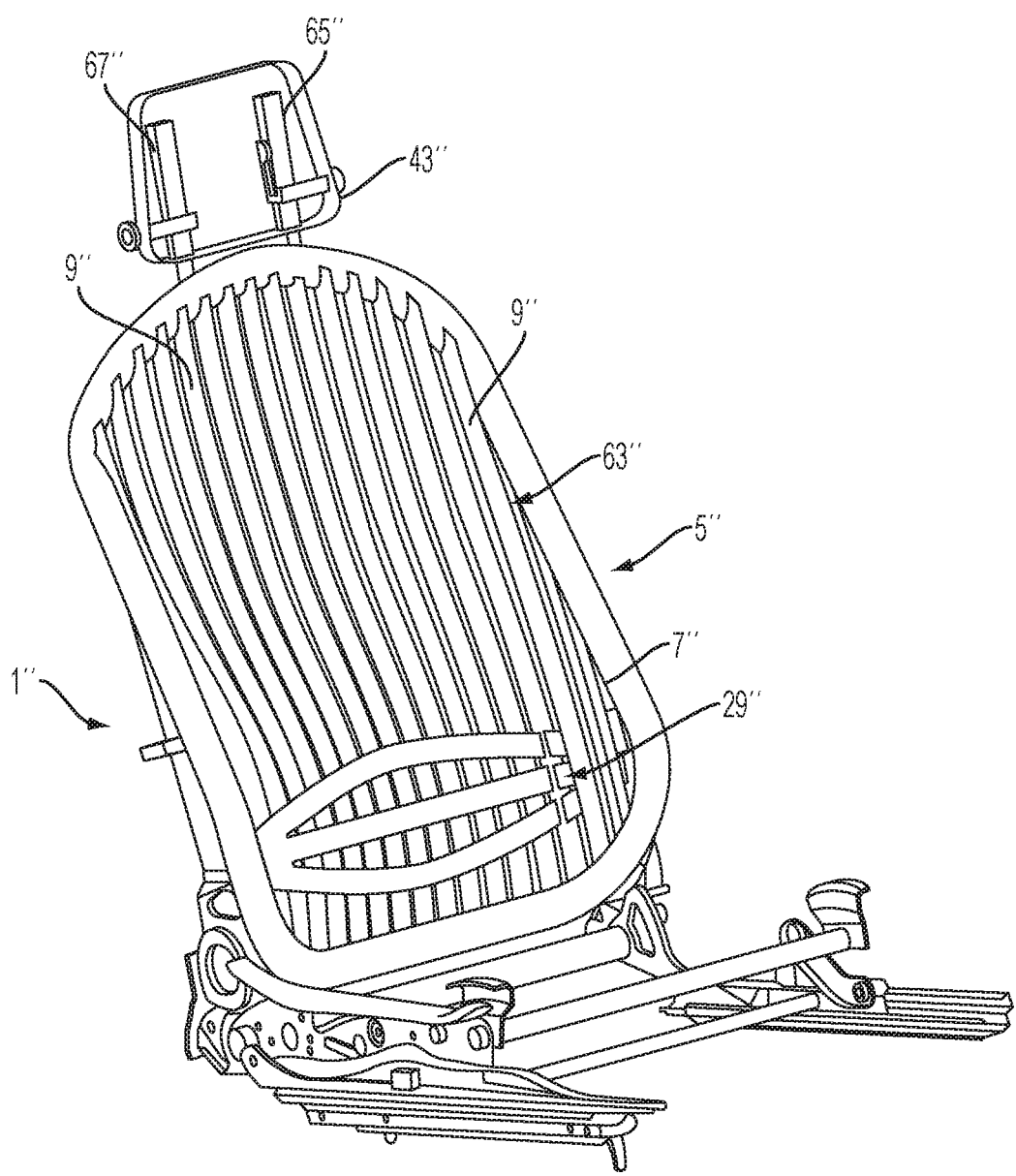
FIG. 10 is a perspective view of another embodiment of a seat of the present invention.

FIG. 10 is a perspective view of another embodiment of a seat 1". The seat 1" is similar to the seat 1 shown in FIG. 1 with the exception that the seat 1" includes an independent headrest 43", which is not defined by seatback support members 9". The seat 1" includes a seatback structure 5", which includes a backrest structure 63". The backrest structure 63" has a plurality of compliant and/or elastically deformable seatback support members 9" that are connected to a seatback frame 7". Each of the plurality of seatback support members 9" is individually fixed to the seatback frame 7". A headrest 43" is connected to the backrest structure 63" via a first headrest connector 65" and a second headrest connector 67".

Figure 11:
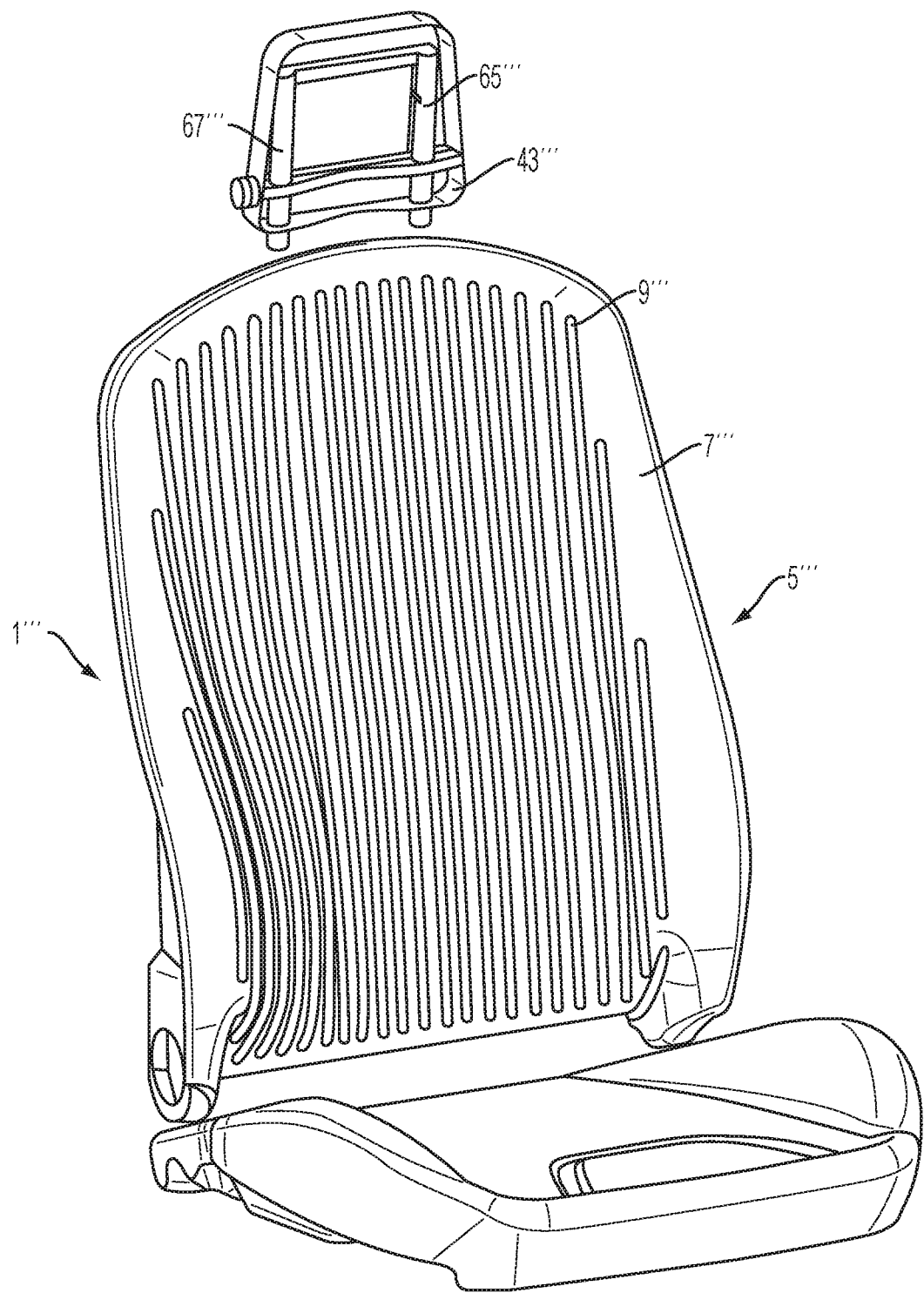
FIG. 11 is a front perspective view of yet another embodiment of the seat.
Figure 14:
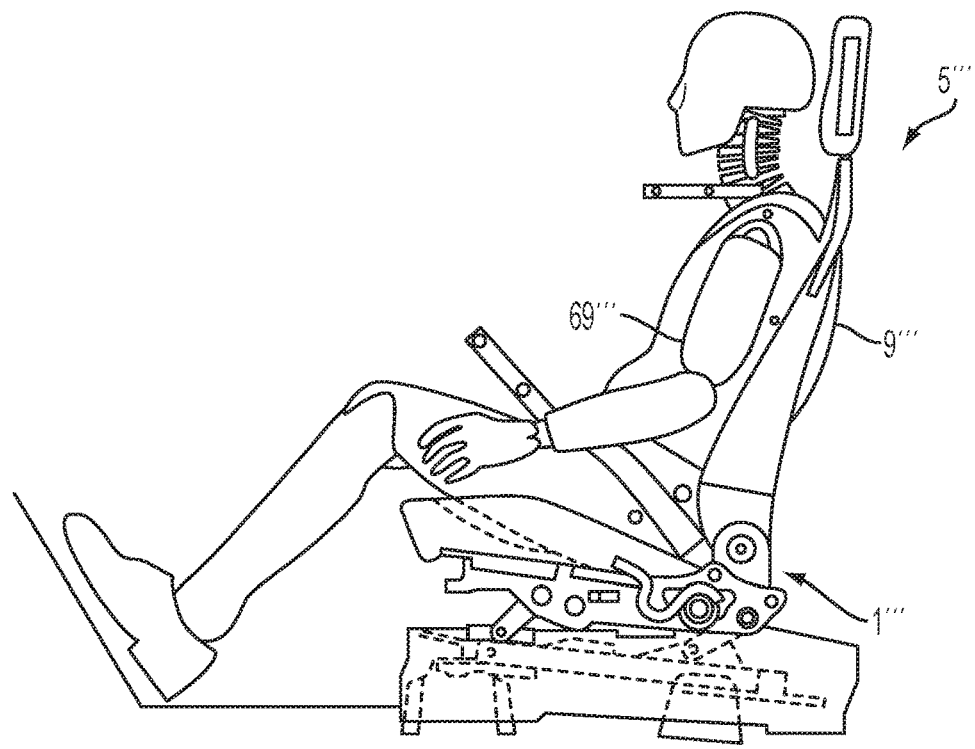
FIG. 14 is a side view of the seat of FIGS. 11 and 12 in a normal state.

FIG. 11 is a perspective view of yet another embodiment of a seat 1'''. The seat 1''' includes a single piece seatback structure 5'''. The single piece seatback structure 5''' includes a plurality of compliant and/or elastically deformable seatback support members 9''', which extend in a vertical direction. The seatback support members 9''' are continuously connected in the lumbar region to allow elongation in a lateral plane in a deflection manner versus an elongation manner. This can be achieved in a manner of approaches from a continuous sinusoidal to square wave design. In combination with a resilient material this would provide a controlled resistance to support the occupant without the need of additional lumbar support members. Also shown in FIG. 14 is a headrest structure 43''' connected to the seatback structure 5''' via a first headrest connector 65''' and a second headrest connector 67'''. The headrest structure 43''' shown includes integrated adjustment features due to the first headrest connector 65''' and the second headrest connector 67''' being affixed to a seat frame and protruding upward to allow the occupant to sink in during a crash.

FIG. 12 is a rear perspective view of the seat 1''' of FIG. 11. The seatback structure 5''' is supported with a lateral constraining/compliant member 29'''.

Figure 13:
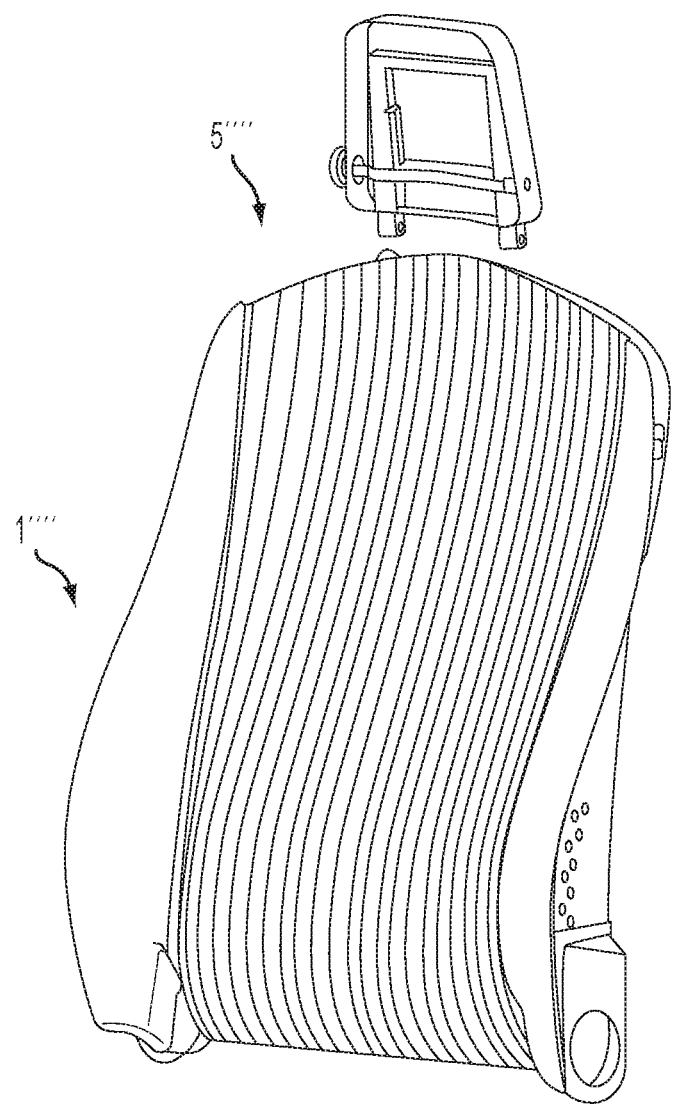
FIG. 13 is a perspective view of yet another embodiment of a seat.

FIG. 13 is a perspective view of another embodiment of a seat 1''''. The seat 1'''' includes a seatback structure 5''''. To provide a softer feel for ingress and egress and due to minimal deflection, a bolster area of the seatback structure 5'''' is made from lower durometer material.

FIG. 14 is a side view of the seat 1''' of FIGS. 11 and 12. The seat 1''' is in a normal state with an occupant 69''' sitting in the seat 1'''. The seatback support members 9''' are compliant and elastically deformable such that an upper region of the seatback support members 9''', in the area of the shoulders of the occupant 69''', deflects or moves relative to a lumbar supporting region of the seatback support member 9'''. This is due to the seatback support members 9''' being more compliant and more elastically deformable in the upper region than a lower region of the seatback members 9'''. The seatback support members 9''' form an essentially S-shape in the normal state with the occupant 69''' in the seat 1'''. The lumbar support member (not shown in FIG. 14) applies a tension to the seatback support members 9' such that the lumbar region of the seatback support members 9''' is stiffer than the upper region of the seatback support members 9". This allows the occupant 69' to sink into the seatback structure 5'''.

Figure 15:
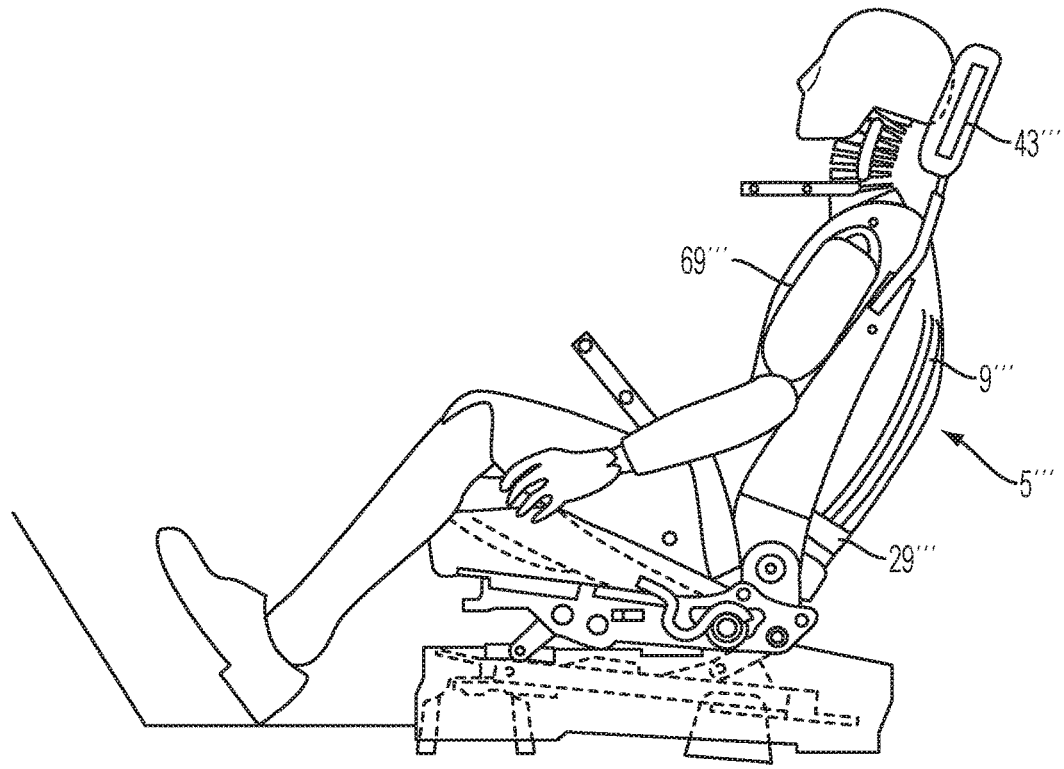
FIG. 15 is a side view of the seat of FIGS. 11, 12 and 14 in a crash state.

FIG. 15 is a side view of the seat 1''' of FIGS. 11, 12 and 14 in a crash state. The tension in the lumbar support member 29''' is increased thereby allowing displacement in lumbar support member 29''', this in turn allows displacement of the seatback support members 9''' so that the seatback support members 9''' deflect and move with the lumbar support member 29'''. The seatback support members 9''' become tensile members and form an essentially C-shape in the crash state. This allows the occupant 69''' to sink into the seatback structure 5''' and contact the headrest structure 43''' so that whiplash is prevented. The seatback structure 5 and the seatback support members 9 of FIGS. 1, 2, 3, 4, 11 and 12 and the seatback structure 5" and the seatback support members 9" of FIG. 13 are compliant and/or elastically deformable to form the same shapes as the seatback structure 5''' and the seatback support members 9''' of FIGS. 17 and 18 in the crash state and the normal state.

Figure 16:
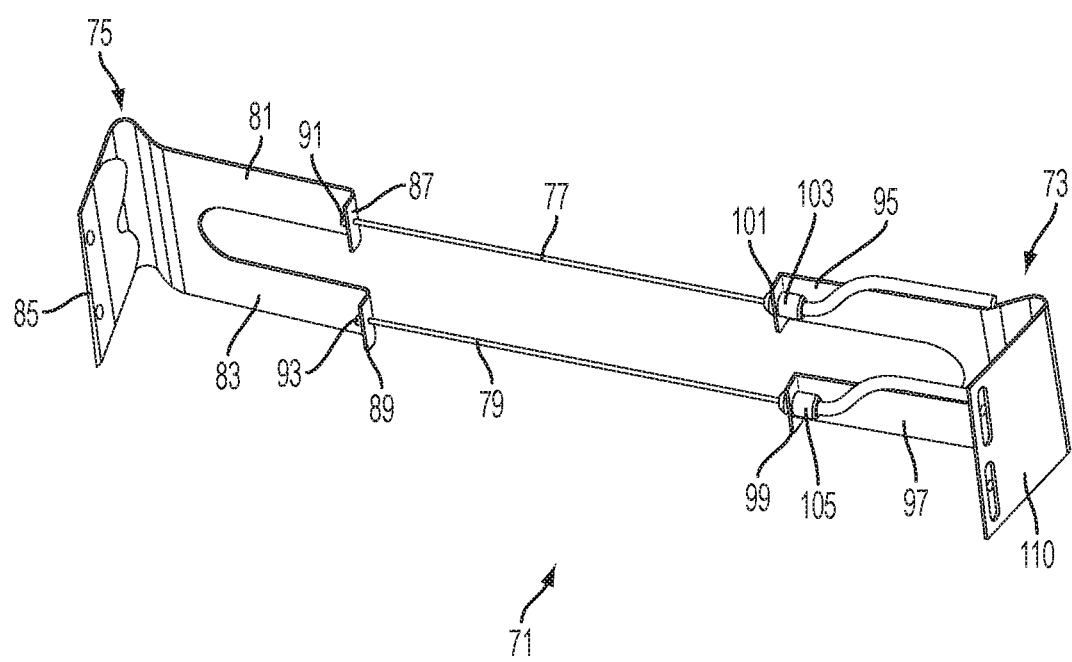
FIG. 16 is a perspective view of a lumbar support structure.

FIG. 16 is a perspective view of a lumbar support structure 71. The lumbar support structure 71 includes a first lumbar support structure element 75 and a second lumbar support structure element 73. The first lumbar support structure element 75 is connected to the second lumbar support structure element 73 via a first lumbar support structure connecting element 77 and a second lumbar support structure connecting element 79. The first lumbar support structure connecting element 77 and the second lumbar support structure connecting element 79 may be formed of a wire or cable as shown or could be conformed from a single joining piece that connects the first lumbar support structure element 75 and the second lumbar support structure element 73. The first lumbar support structure element 75 includes a first lumbar support structure first extending portion 81, a first lumbar support structure second extending portion 83 and a first lumbar support structure third extending portion 85. The first lumbar support structure 75 may be connected to a seat frame via the first lumbar support structure third extending portion 85. The first lumbar support structure first extending portion 81 includes a bent portion 87. One end or end portion of the first lumbar support structure connecting element 77 is connected to the bent portion 87 via a fastening element 91. The first lumbar support structure second extending portion 83 includes a bent portion 89. One end or end portion of the second lumbar support structure connecting element 79 is connected to the bent portion 89 via another fastening element 93. The first lumbar support structure element 75 forms a leaf spring and may be particularly formed of metal. This allows the first lumbar support first extending portion 81 and the first lumbar support second extending portion 83 to bend relative to the first lumbar support structure third extending portion 85. The second lumbar support structure 73 includes a second lumbar support structure first extending portion 95, a second lumbar support structure second extending portion 97 and a second lumbar support structure third extending portion 110. The second lumbar support structure element 75 may be connected to the seat frame via the second lumbar support structure third extending portion 110. The second lumbar support structure first extending portion 95 includes a bent portion 101. Another end or another end portion of the first lumbar support structure connecting element 77 is connected to the bent portion 101 via a connection element 103. The second lumbar support structure second extending portion 97 includes a bent portion 99. Another end or another end portion of the second lumbar support structure connecting element 79 is connected to the bent portion 99 via another connection element 105. The second lumbar support structure element 73 forms a leaf spring and may be particularly formed of metal. This allows the second lumbar support structure first extending portion 95 and the second lumbar support structure second extending portion 97 to deflect relative to the second lumbar support structure third extending portion 110. The lumbar support structure 71 may be adjustable such that the tension in the first lumbar support structure connecting element 77 and the tension in the second lumbar support structure connecting element 79 is adjustable. The tension may be adjusted by one or more actuators that are connected to the first lumbar support structure connecting element 77 and the second lumbar support structure connecting element 79 wherein the one or more actuators are controlled to adjust the tension of the first lumbar support structure connecting element 77 and the second lumbar support structure connecting element 79. In another embodiment, the lumbar support structure 71 is made in one piece such that the tension in the first lumbar support structure connecting element 77 and the tension in the second lumbar support structure connecting element 79 is not adjustable.

Figure 17:
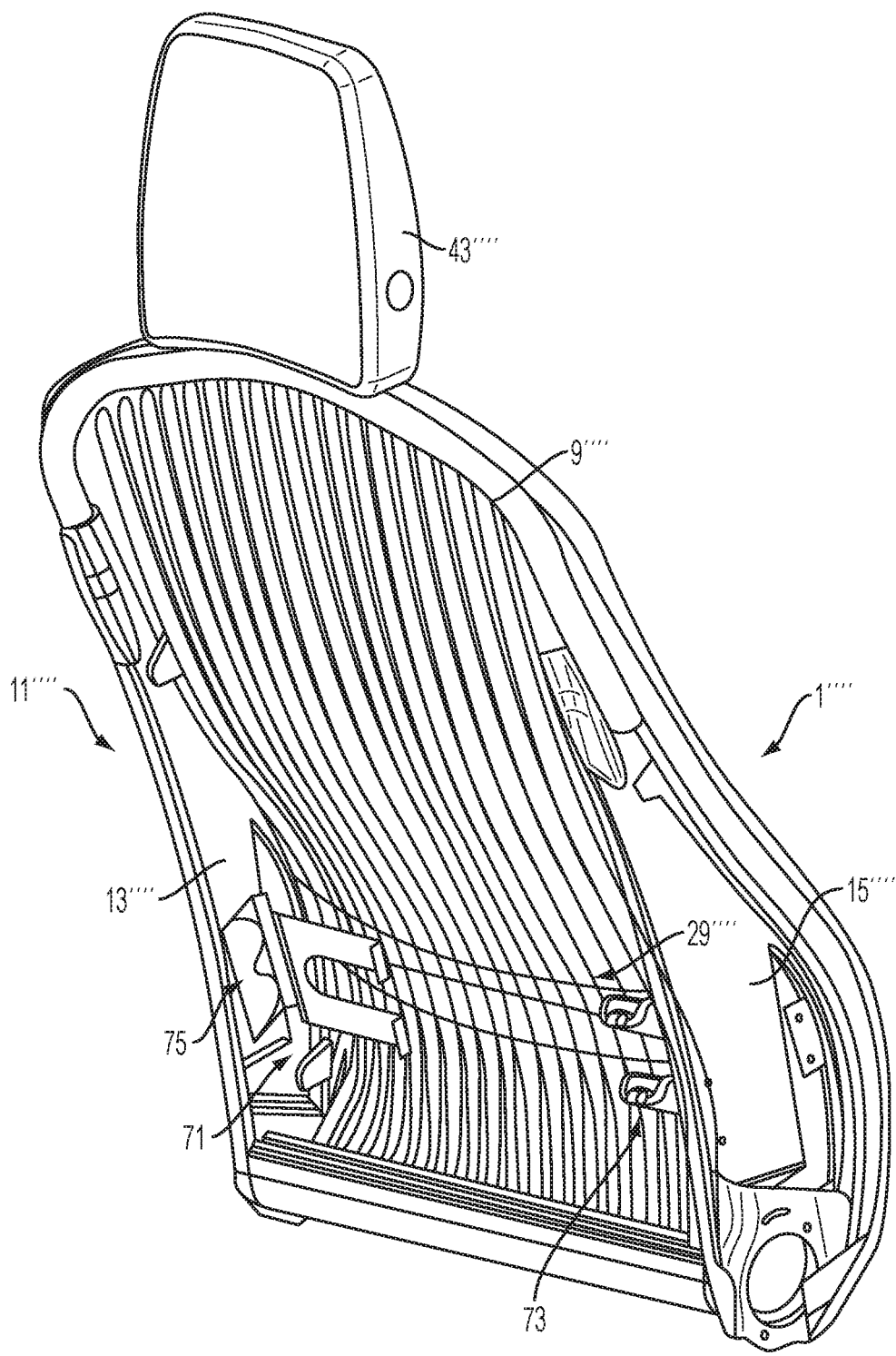
FIG. 17 is a perspective view of yet another embodiment of a seat.
Figure 19:
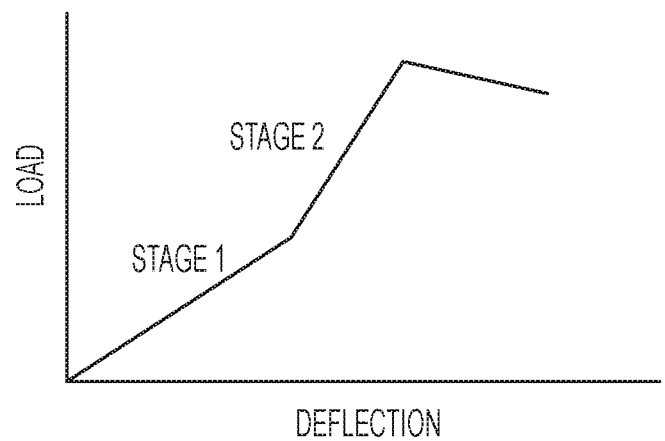
FIG. 19 is a graphic view of the load vs. deflection of the lumbar support structure of FIG. 16.

FIG. 17 is a perspective view of yet another embodiment of a seat 1''''. The seat 1'''' includes a plurality of compliant interconnected seatback support members 9'''' and a headrest structure 43'''', which may or may not be defined by the plurality of interconnected seatback support members 9''''. A lumbar support member 29'''' is connected to one or more of the plurality of seatback support members 9''''. A seat frame 11'''' is connected to the plurality of interconnected seatback support members 9''''. The seat frame 11'''' includes a first side member 13'''' and a second side member 15''''. The lumbar support structure 71 of FIG. 19 is connected to the first side member 13'''' and the second side member 15''''. The first lumbar support structure 75 may engage the first side member 13'''' and the second lumbar support structure 73 may engage the second side member 15''''. In another embodiment, the lumbar support structure 71 is connected to the seat 1'''' without a lumbar support member 29'''' connected to the plurality of seatback support members 9'''' such that the stiffness and displacement of plurality of seatback support members 9'''' is based on the lumbar support structure 71.

Figure 18:
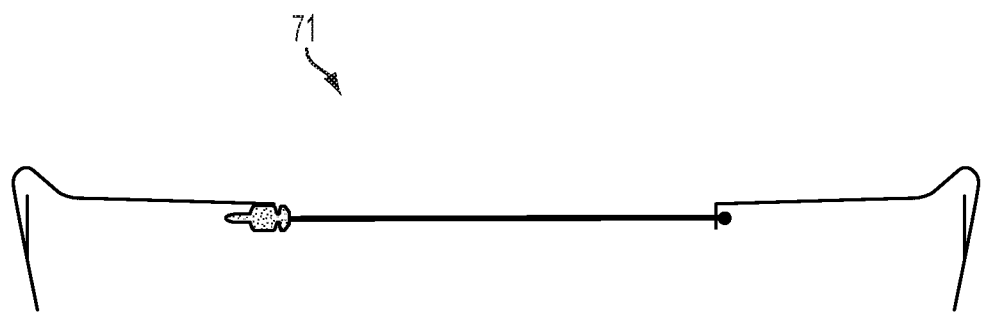
FIG. 18 is top schematic view of the lumbar support structure of FIG. 16.

FIG. 18 is a top schematic view of the lumbar support structure 71. The lumbar support structure 71 provides a flatter (less concave) area of a seat while providing more flexibility at the sides of the seat.

FIG. 19 is a graphic view of the load versus the amount of deflection of the lumbar support structure 71 of FIG. 16.

Figure 20:
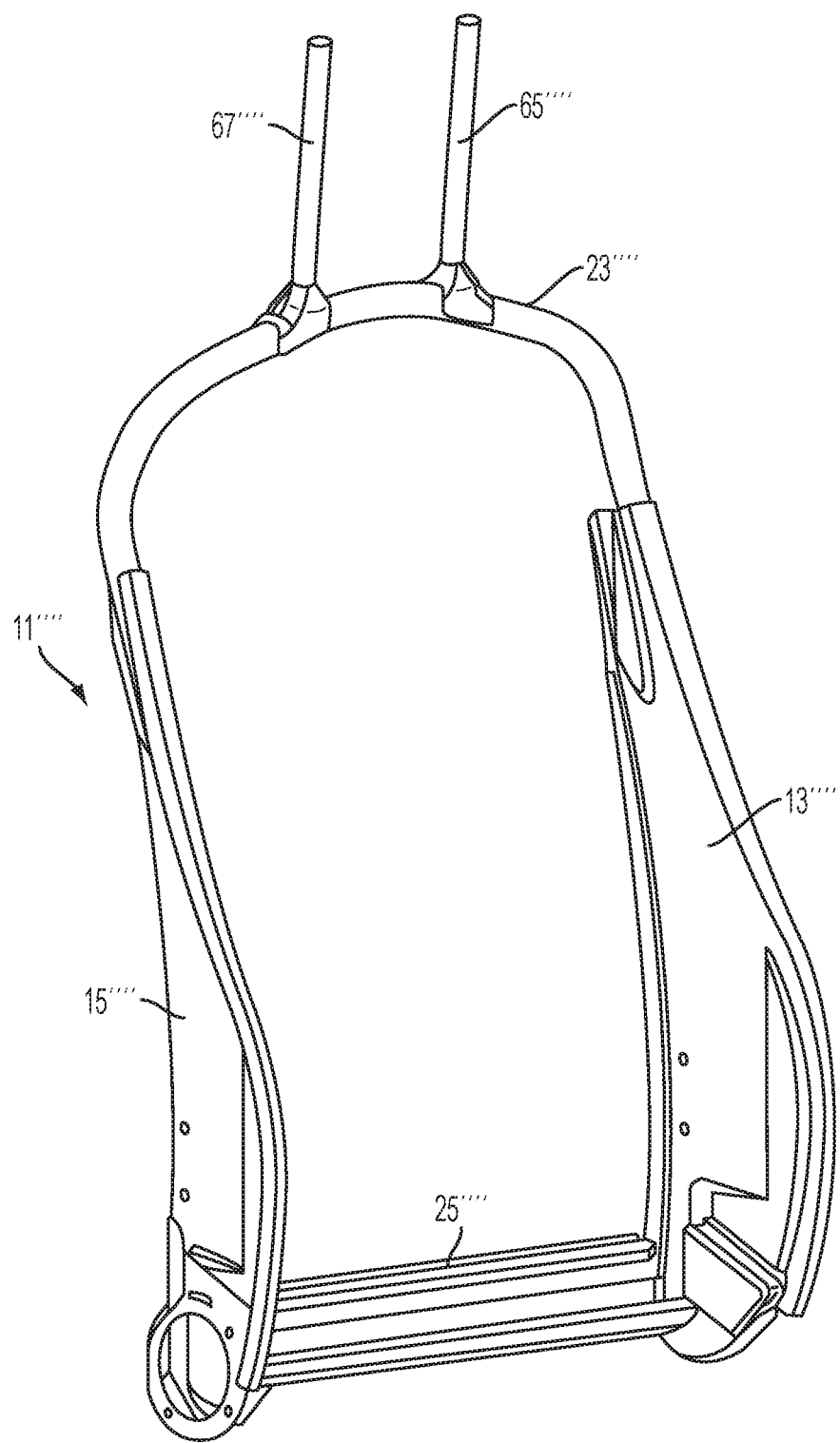
FIG. 20 is a perspective view of a seat frame associated with the seat of FIG. 17.

FIG. 20 is a perspective view of the seat frame 11'''' associated with the seat 1'''' of FIG. 17. The seat frame 11'''' includes the first side member 13'''', the second side member 15'''', a first frame portion 23'''' and a second frame portion 25''''. The second frame portion 23'''' is connected to the first side member 13'''' and the second side member 15''''. The first frame portion 23'''' is connected to the first side member 13'''' and the second side member 15''''. A first headrest connector 65'''' and a second headrest connector 67'''' are connected to the first frame portion 23''''.

Figure 21:
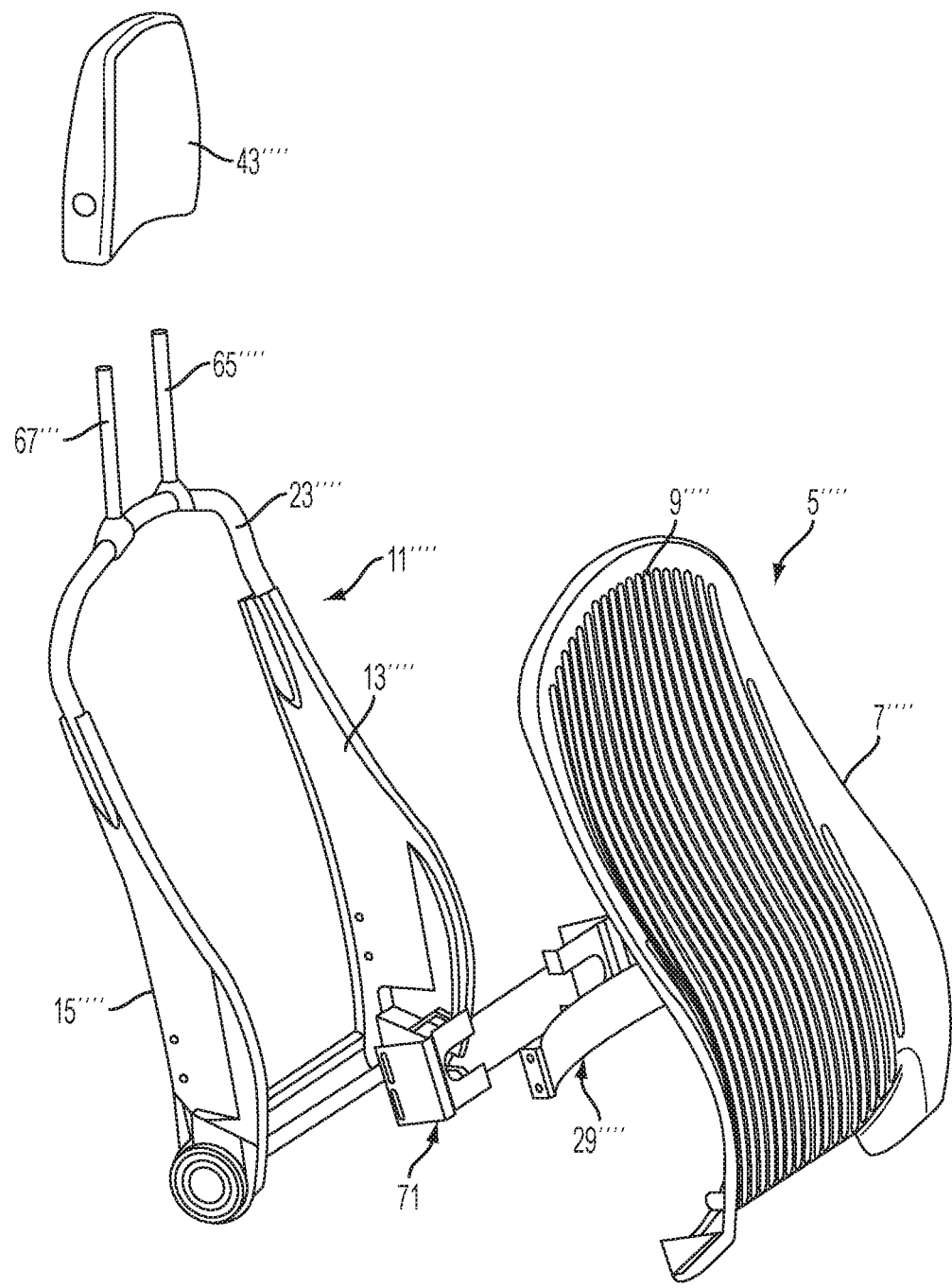
FIG. 21 is an exploded view of the seat of FIG. 17.

FIG. 21 is an exploded view of the seat 1'''' of FIG. 20. The plurality of interconnected seatback support member 9'''' are integrally connected to a seatback frame 7'''' to form a one-piece, singular seatback structure 5''''. The seatback structure 5'''' is connected to the seat frame 11''''. The lumbar support member 29'''' and the lumbar support structure 71 are connected to the seat frame 11''''. The headrest structure 43'''' is connected to the seat frame 11'''' via the first headrest connector 65'''' and the second headrest connector 67''''.

Figure 22:
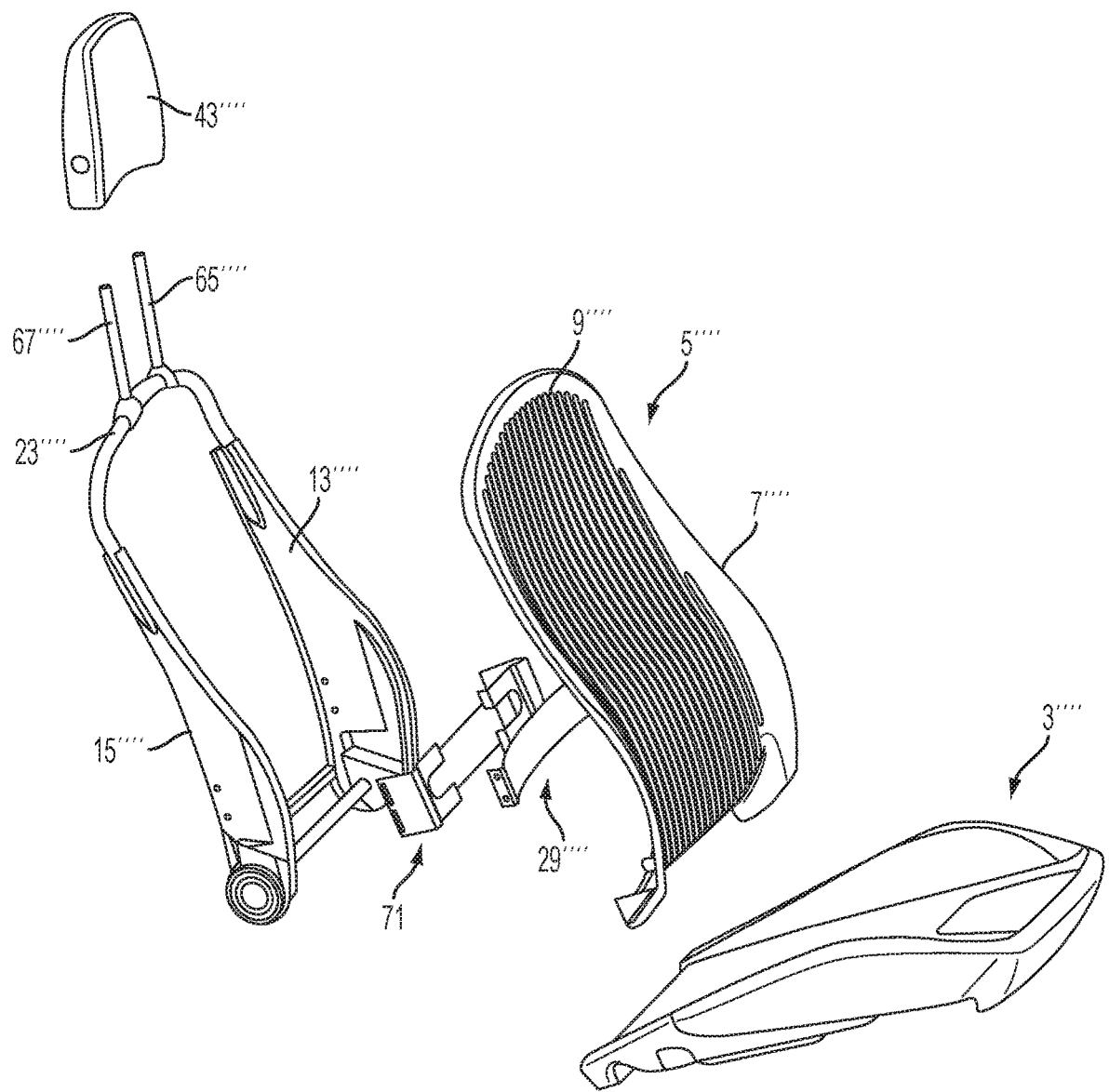
FIG. 22 is another exploded view of the seat of FIG. 17.

FIG. 22 is an exploded view of the seat 1'''' of FIG. 17. FIG. 22 is the same as FIG. 21 with the exception that a seat bottom structure 3'''' is connected to the seat frame 11''''.

Figure 23:
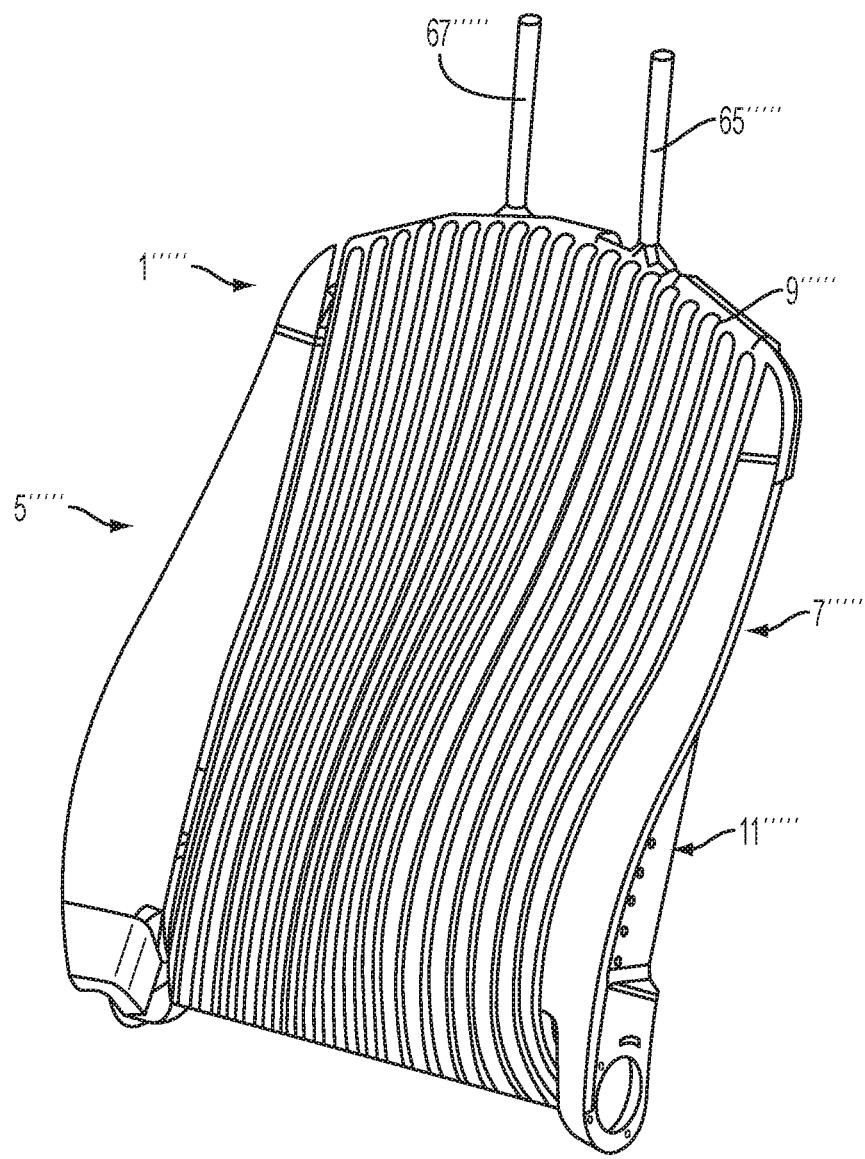
FIG. 23 is a perspective view of yet another embodiment of a seat.

FIG. 23 is a perspective view of another embodiment of a seat 1''''' that includes a seatback structure 5'''''. The seatback structure 5''''' includes a seatback frame 7''''' that is connected to a plurality of seatback support members 9'''''. The seatback structure 5''''' is connected to a seat frame 11''''', preferably by a snap connection that is associated with the seatback structure 5''''' and the seat frame 11'''''. A first headrest connector 65''''' and a second headrest connector 67''''' are connected to the seat frame 11'''''.

Figure 24:
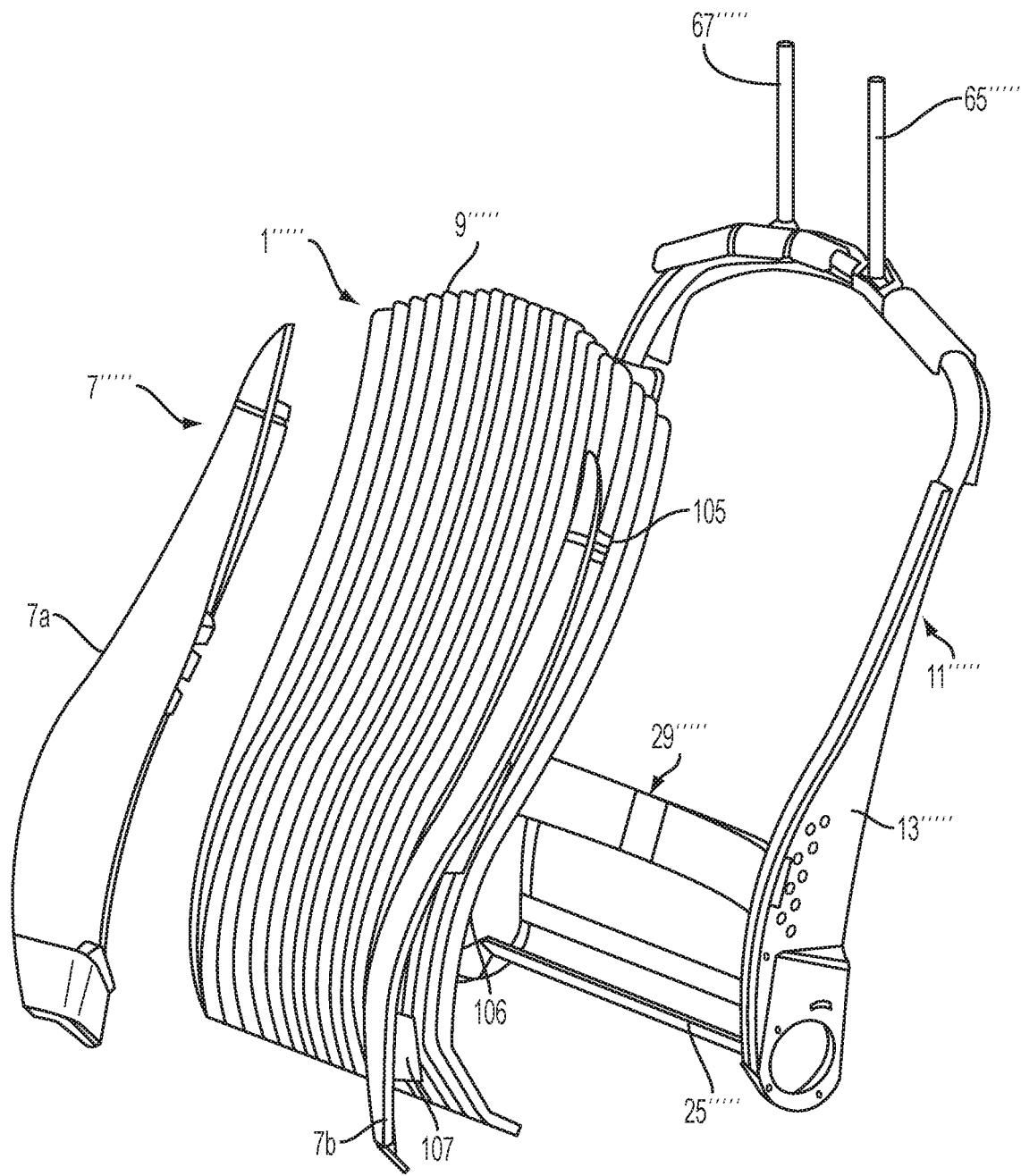
FIG. 24 is an exploded view of the seat of FIG. 23.

FIG. 24 is an exploded view of the seat 1''''' of FIG. 23. The seatback frame 7''''' includes a first seatback frame portion 7a and a second seatback frame portion 7b. The plurality of seatback support members 9''''' are connected to the first seatback frame portion 7a and the second seatback frame portion 7b. The seatback frame 7''''' is connected to the seat frame 11''''' via snap connecting portion 105, snap connecting portion 106 and snap connecting portion 107. However, it is understood that any type of connection may be used to connect the seatback frame 7''''' to the seat frame 11'''''. The plurality of seatback support members 9''''' may co-molded together or the plurality of seatback support members 9''''' may be individually connected to one another. A lumbar support member 29''''' is connected to the seat frame 11'''''. A portion of the lumbar support member 29''''' engages a first side member 13''''' of the seat frame 11'''''. FIG. 24 shows design principles that would apply to the insert panel only.

Figure 25:
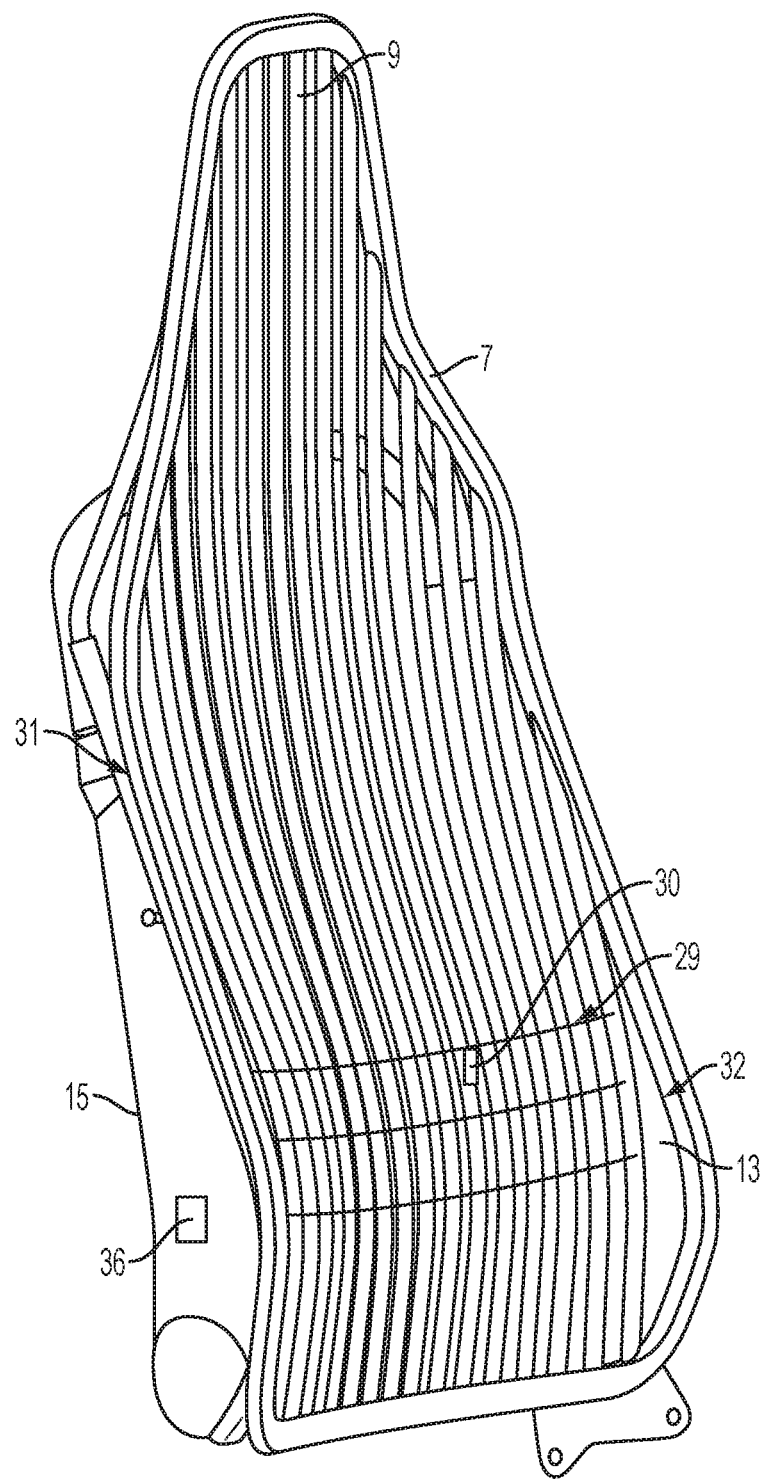
FIG. 25 is another perspective view of the seat of FIG. 4.

FIG. 25 is another perspective view of the seatback of FIG. 4. A strain gauge 30 is connected to one or more of the lumbar support member 29 and one or more of the plurality of seatback support members 9. The strain gauge 30 measures a deflection of one or more of the lumbar support member 29 and one or more of the plurality of seatback support members 9 to define a measured deflection. A control means 36 receives the measured deflection as input and the control means 36 controlling the tension of the lumbar support member 29 based on the measured deflection such that a shape of one or more of the plurality of seatback support members 9 is controlled via the control means 36. The control means 36 is shown in FIG. 25 as being connected to the seatback, however the control means 36 can be mounted any where in a motor vehicle.

While specific embodiments of the invention have been shown and described in detail to illustrate the application of the principles of the invention, it will be understood that the invention may be embodied otherwise without departing from such principles.

What is claimed is:

1. A seat for a vehicle, comprising:
   a seatback structure comprising a plurality of seatback support members, said seatback support members being connected to a seatback frame, said seatback support members defining a support surface extending from one side of said seatback frame to another side of said seatback frame and from at least a position adjacent to a lower portion of said seatback frame to an upper portion of said seatback frame, said seatback structure comprising a first lateral end and a second lateral end;
   a seat frame, said seatback structure being connected to said seat frame, said seat frame comprising a first lateral seat frame member, a second lateral seat frame member, a first transverse seat frame member and a second transverse seat frame member, said first transverse seat frame member and said second transverse seat frame member extending between said first lateral seat frame member and said second lateral seat frame member, said first lateral seat frame member and said second lateral seat frame member extending from said first transverse seat frame member in an upward direction toward said second transverse seat frame member, said first lateral seat frame member being located directly adjacent to said first lateral end, said second lateral seat frame member being located directly adjacent to said second lateral end;
   a lumbar support structure comprising a first lumbar support structure element and a second lumbar support structure element and a lumbar support structure connecting element bridging a space between said first lumbar support structure and said second lumbar support structure element, said first lumbar support structure element being in contact with said first lateral seat frame member, said second lumbar support structure element being in contact with said second lateral seat frame member, wherein said first lumbar support structure element is located at a spaced location from said second lumbar support structure element.

2. A seat in accordance with claim 1, wherein said plurality of seatback support members are integrally connected to said seatback frame to form a single, one-piece seatback structure, said seatback structure being laterally connected to said seat frame such that said seatback structure is movable relative to said seat frame, wherein said seatback support members comprise vertically-oriented strips, said vertically-oriented strips being interconnected in a ribbed manner to create a wave to control lateral elongation of the seatback structure, said vertically-oriented strips comprising thermoplastic material, whereby said vertically-oriented strips form a suspension system for the seat structure, said single, one-piece seatback structure comprising a lumbar support region for supporting a lumbar region of the user and an upper user support region, said single, one-piece seatback structure being least compliant and/or least deformable in said lumbar support region than in said upper user support region, wherein said support surface continuously extends from said one side of said seatback frame to said another side of said seatback frame and continuously from said lower portion of said seatback frame to said upper portion of said seatback frame, wherein an opening is defined between said first lateral seat frame member, said second lateral seat frame portion, said first transverse seat frame member and said second transverse seat frame member, at least a portion of one or more of said vertically-oriented strips being located in said opening when said one or more of said vertically-oriented strips is in a deformed state.

3. A seat in accordance with claim 1, further comprising: fastener elements, wherein said seatback frame comprises a lower portion and an upper portion, each of said plurality of seatback support members comprising a strip of vertically-oriented material extending from said lower portion to said upper portion, wherein each of plurality of seatback support members is individually fixed to said lower portion via one of said fastener elements and each of said plurality of seatback support members is individually fixed to said upper portion via another one of said fastener elements, wherein said support surface is fixed to at least said one side of said seatback frame, said another side of said seatback frame and said upper portion of said seatback frame, at least a portion of said seat frame being located rearward of said seatback frame.

4. A seat in accordance with claim 1, wherein one or more of a stiffness and an elastic deformation of said plurality of seatback support members is adjusted based on a tension of said lumbar support structure, wherein vertical strip resistance of displacement is increased when tension of said lumbar support structure is increased, wherein said seatback structure is connected to said seat frame via at least one snap connection, said first lumbar support structure element comprising a first lumbar support structure element extending portion and a first lumbar support structure element bent portion, said first lumbar support structure element bent portion being bent relative to said first lumbar support structure element extending portion, said second lumbar support structure element comprising a second lumbar support structure element extending portion and a second lumbar support structure element bent portion, said second lumbar support structure element bent portion being bent relative to said second lumbar support structure element extending portion, at least a portion of said lumbar support structure connecting element extending between said first lumbar support structure element bent portion and said second lumbar support structure element bent portion.

5. A seat in accordance with claim 4, wherein said lumbar support structure extends from one side of said seatback frame to another side of said seatback frame in a direction that is transverse to a direction of said plurality of seatback support members, each of said plurality of seatback support members comprising a lower portion, said lumbar support structure being arranged adjacent to said lower portion of said one or more of said plurality seatback support members, at least said lumbar support structure and said lower portion of said seatback support members defining a lumbar region of said seatback structure, at least a portion of said support surface defining a headrest support surface for supporting a head area of a user, said first lumbar support structure element comprising a first lumbar support structure element second extending portion and a first lumbar support structure element second bent portion, said first lumbar support structure element second bent portion being bent relative to said first lumbar support structure element second extending portion, said second lumbar support structure element comprising a second lumbar support structure element second extending portion and a second lumbar support structure element second bent portion, said second lumbar support structure element second bent portion being bent relative to said second lumbar support structure element second extending portion, said lumbar support structure comprising another lumbar support structure connecting element, at least a portion of said another lumbar support structure connecting element extending between said first lumbar support structure element second bent portion and said second lumbar support structure element second bent portion.

6. A seat in accordance with claim 1, wherein each of said plurality of seatback support members comprises a shoulder support surface and a lumbar support surface, said shoulder support surface of each of said seatback support members defining a shoulder support region of said support surface, said lumbar support surface of each of said seatback support members defining a lumbar support region of said support surface, said lumbar support region of said support surface being concave, said shoulder support region having a concavity that is less than a concavity of said lumbar support region.

7. A seat in accordance with claim 4, wherein each of said plurality of seatback support members is elastically deformable, at least a portion of said plurality of seatback support members defining a concave surface with a first concavity in a normal state, said at least said portion of said plurality of seatback support members defining said concave surface with a second concavity in a crash state, said second concavity being greater than said first concavity, wherein an elastic deformation of said plurality of seatback support members is greater in said crash state than an elastic deformation of said plurality of seatback support members in said normal state, wherein a displacement of said lumbar support structure is greater in said crash state than the displacement of said lumbar support structure in said normal state such that one or more of said plurality of seatback support members move upon said one or more of said plurality of seatback support members moving from said normal state to said crash state, whereby a user sinks into said seatback support members in said crash state, said another lumbar support structure connecting element being located at a spaced location from said lumbar support structure connecting element, said first lumbar support structure element extending portion being located at a spaced location from said first lumbar support structure element second extending portion, said second lumbar support structure element extending portion being located at a spaced location from said second lumbar support structure element second extending portion.

8. A seat in accordance with claim 7, wherein said lumbar support structure supports said one or more of said plurality of seatback support members in said crash state, said lumbar support structure having a first shape in said normal state, said lumbar support structure having a second shape in said crash state, wherein said lumbar support structure reverts toward said first shape after said crash state, wherein said seatback structure is of a size that is greater than a size of an occupant, said seatback structure having no internal appendages to impede passage of the occupant during a crash state.

9. A seat in accordance with claim 4, wherein said lumbar support structure is adjustable such that a shape of one or more of said plurality of seatback support members is changed based on a position of said lumbar support member.

10. A seat in accordance with claim 4, further comprising:
a control means for controlling the tension of said lumbar support structure;
a strain gauge connected to one or more of said lumbar support structure and one or more of said plurality of seatback support members, said strain gauge measuring a deflection of said one or more of said lumbar support structure and one or more of said plurality of seatback support members to define a measured deflection, said control means receiving said measured deflection as input and said control means controlling the tension of said lumbar support structure based on said measured deflection, wherein a shape of said one or more of said plurality of seatback support members is controlled via said control means.

11. A seat in accordance with claim 1, wherein said plurality of seatback support members comprises a shoulder support region and a lumbar support region, said shoulder support region having a shoulder support region shape in a normal state, said lumbar support region having a lumbar support region shape in said normal state, said lumbar support region shape being different from said shoulder support region shape in said normal state, wherein said shoulder support region of said plurality of seatback support members deflect upon a user engaging occupying said seatback structure, wherein the user sinks in to said shoulder support region in the normal state, said lumbar support region having another lumbar support region shape in a crash state, said another lumbar support region shape being different from said lumbar support region shape.

12. A seat for a vehicle, comprising:
a seatback suspension panel comprising a seatback suspension panel frame and a plurality of elastically deformable vertically oriented seatback suspension panel elements, each of said seatback suspension panel elements being connected to said seatback suspension panel frame, said seatback suspension panel elements defining a support surface extending continuously between one side of said seatback panel frame to another side of said seatback panel frame and from at least a position adjacent to a lower portion of said seatback panel frame to an upper portion of said seatback panel frame, said seatback suspension panel frame comprising a first seatback suspension panel frame lateral end portion and a second seatback suspension panel frame lateral end portion;
a seat frame structure, said seatback suspension panel being connected to said seat frame structure, said seat frame structure comprising a first lateral seat frame member, a second lateral seat frame member, a first transverse seat frame member and a second transverse seat frame member, said first transverse seat frame member and said second transverse seat frame member extending between said first lateral seat frame member and said second lateral seat frame member, said first lateral seat frame member and said second lateral seat frame member extending from said first transverse seat frame member in an upward direction toward said second transverse seat frame member, said first lateral seat frame member being located directly adjacent to said first seatback suspension panel frame lateral end portion, said second lateral seat frame member being located directly adjacent to said second seatback suspension panel frame lateral end portions;
a lumbar support structure comprising a first lumbar support structure element and a second lumbar support structure element and a lumbar support structure connecting element bridging a space between said first lumbar support structure and said second lumbar support structure element, said first lumbar support structure element being in contact with said first lateral seat frame member, said second lumbar support structure element being in contact with said second lateral seat frame member, wherein said first lumbar support structure element is located at a spaced location from said second lumbar support structure element.

13. A seat in accordance with claim 12, wherein said plurality of elastically deformable seatback suspension panel elements define a seat support surface having at least a concave surface, said at least said concave surface having a first concavity in a non-crash state of said seatback suspension panel, said at least said concave surface having a second concavity in a crash state of said seatback suspension panel, said first concavity being less than said second concavity, wherein elastic deformation of said elastically deformable seatback suspension panel elements is greater in said crash state than in said non-crash state, at least a portion of the seat frame structure being located rearward of said seatback suspension panel frame, wherein an opening is defined between said first lateral seat frame member, said second lateral seat frame portion, said first transverse seat frame member and said second transverse seat frame member, at least a portion of said concave surface being located in said opening when the one or more of said vertically-oriented strips is in said crash state.

14. A seat in accordance with claim 12, wherein a lumbar support structure extends from one side of said seatback suspension panel frame to another side of said seatback suspension panel frame, said setback suspension panel elements comprising a lower portion, said lower portion defining a lumbar region of said seatback suspension panel for supporting the lumbar region of a user.

15. A lumbar system, comprising:
a seatback support structure;
a seatback frame, said seatback support structure being laterally fixed to said seatback frame, wherein said seatback support structure is displaceable relative to said seatback frame, said seatback support structure comprising a surface extending continuously between a lateral portion of said seatback frame, another lateral portion of said seatback frame, a lower portion of said seatback frame and an upper portion of said seatback frame;
a seat frame comprising a first lateral seat frame member and a second lateral seat frame member, one lateral end portion of said seatback frame being located directly adjacent to said first lateral seat frame member and another lateral end portion of said seatback frame being located directly adjacent to said second lateral seat frame member;
a lumbar support structure comprising a first lumbar support structure element and a second lumbar support structure element and a lumbar support structure connecting element bridging a space between said first lumbar support structure and said second lumbar support structure element, said first lumbar support structure element being in contact with said first lateral seat frame member, said second lumbar support structure element being in contact with said second lateral seat frame member, wherein said first lumbar support structure element is located at a spaced location from said second lumbar support structure element.

16. A lumbar system in accordance with claim 15, wherein said seatback support structure comprises a plurality of vertically oriented seatback support members, said plurality of vertically oriented seatback support members defining said surface, said seatback frame being in direct contact with said first lateral seat frame member and said second lateral seat frame member.

17. A lumbar system in accordance with claim 15, wherein said plurality of vertically oriented seatback support members are integrally connected to said seatback frame to form a single, one-piece seatback structure, said vertically-oriented strips comprising thermoplastic material, said single, one-piece seatback structure comprising a lumbar support region for supporting a lumbar region of the user and an upper user support region, said single, one-piece seatback structure being least compliant and/or least deformable in said lumbar support region than in said upper user support region, said first lateral seat frame member and said second lateral seat frame member defining at least a portion of an opening, at least a portion of one or more of said vertically-oriented strips being located in said opening in a deformed state of said one or more of said vertically-oriented strips.

18. A lumbar system in accordance with claim 15, wherein displacement of said seatback support structure is controlled via said lumbar support structure, each of said first lateral seat frame member and said second lateral seat frame member being connected to said seatback frame via a snap connection.

19. A lumbar system in accordance with claim 18, wherein the displacement of said seatback support structure is controlled via said lumbar support structure, wherein said first lumbar support structure element comprises a first lumbar support structure element extending portion and a first lumbar support structure element bent portion, said first lumbar support structure element bent portion being bent relative to said first lumbar support structure element extending portion, said second lumbar support structure element comprising a second lumbar support structure element extending portion and a second lumbar support structure element bent portion, said second lumbar support structure element bent portion being bent relative to said second lumbar support structure element extending portion, at least a portion of said lumbar support structure connecting element extending between said first lumbar support structure element bent portion and said second lumbar support structure element bent portion, wherein an upper portion of said surface defines a headrest support surface for supporting a head area of a user.

20. A lumbar system in accordance with claim 19, wherein said first lumbar support structure element comprises a first lumbar support structure element second extending portion and a first lumbar support structure element second bent portion, said first lumbar support structure element second bent portion being bent relative to said first lumbar support structure element second extending portion, said second lumbar support structure element comprising a second lumbar support structure element second extending portion and a second lumbar support structure element second bent portion, said second lumbar support structure element second bent portion being bent relative to said second lumbar support structure element second extending portion, said lumbar support structure comprising another lumbar support structure connecting element, at least a portion of said another lumbar support structure connecting element extending between said first lumbar support structure element second bent portion and said second lumbar support structure element second bent portion.

* * * * *